US 7,299,408 B1

(12) United States Patent
Daconta et al.

(10) Patent No.: US 7,299,408 B1
(45) Date of Patent: Nov. 20, 2007

(54) ELECTRONIC DOCUMENT VALIDATION

(75) Inventors: Michael Daconta, Bealeton, VA (US);
Mark Oliphant, Easton, MD (US)

(73) Assignee: Fannie Mae, Washington, DC (US)

( * ) Notice: Subject to any disclaimer, the term of this patent is extended or adjusted under 35 U.S.C. 154(b) by 331 days.

(21) Appl. No.: 10/339,775

(22) Filed: Jan. 9, 2003

Related U.S. Application Data

(60) Provisional application No. 60/369,030, filed on Apr. 1, 2002.

(51) Int. Cl.
*G06F 17/00* (2006.01)
(52) U.S. Cl. ..................... 715/513; 715/500
(58) Field of Classification Search ........... 715/513, 715/516
See application file for complete search history.

(56) References Cited

U.S. PATENT DOCUMENTS

| | | |
|---|---|---|
| 5,615,268 A | 3/1997 | Bisbee et al. |
| 5,748,738 A | 5/1998 | Bisbee et al. |
| 6,189,009 B1 | 2/2001 | Stratigos et al. |
| 6,209,095 B1 | 3/2001 | Anderson et al. |
| 6,237,096 B1 | 5/2001 | Bisbee et al. |
| 6,289,460 B1 | 9/2001 | Hajmiragha |
| 6,367,013 B1 | 4/2002 | Bisbee et al. |
| 6,438,526 B1 | 8/2002 | Dykes et al. |
| 6,452,614 B1 | 9/2002 | King et al. |
| 6,456,981 B1 | 9/2002 | Dejaeger et al. |
| 6,594,633 B1 | 7/2003 | Broerman |
| 6,609,200 B2 * | 8/2003 | Anderson et al. ........... 713/176 |
| 6,635,089 B1 | 10/2003 | Burkett et al. |
| 6,751,632 B1 | 6/2004 | Petrogiannis |
| 2001/0005829 A1 | 6/2001 | Raveis |
| 2001/0018739 A1 | 8/2001 | Anderson et al. |
| 2001/0029482 A1 | 10/2001 | Tealdi et al. |
| 2001/0044764 A1 | 11/2001 | Thomas |
| 2002/0010679 A1 | 1/2002 | Felsher |

(Continued)

FOREIGN PATENT DOCUMENTS

JP    2003256744    9/2003

(Continued)

OTHER PUBLICATIONS

"XML Schema Part 1: Structures", W3C Recommendation May 2001, Thompson et al., Eds., pp. 1-3, 17-19, 134-136.*
Yoder et al., "Architecture and Design of Adaptive Object-Models," ACM SIGPLAN Notices, vol. 36, Issue 12, copyright 2000, ACM Press, p. 50-60.*
"Smart Document Specification—RC6.6", Mortage Bankers Association of America, Inc., Sep. 19, 2002, pp. 1-87.
"Guidelines for Document Custodians", Fannie Mae, Sep. 9, 1999.

*Primary Examiner*—William Bashore
*Assistant Examiner*—Amelia Rutledge
(74) *Attorney, Agent, or Firm*—Rader Fishman & Grauer PLLC

(57) ABSTRACT

Electronic documents are validated through application of a set of validation rules. One example of an electronic document to be validated has main data and view portions, wherein the main data portion can be parsed separately from the view portion, and the view portion includes presentation formatting for providing a display corresponding to the main data portion. There, the validation rules include comparison rules for determining whether a display provided by the view portion substantially matches the main data portion. Linking elements in the electronic document that point to corresponding information field in the view and main data portions can accommodate the matching comparison. Other types of validation rules include membership rules and reference identifier rules, and various document views corresponding to a given transaction can be separately validated.

56 Claims, 23 Drawing Sheets

U.S. PATENT DOCUMENTS

| | | |
|---|---|---|
| 2002/0019838 A1 | 2/2002 | Petrogiannis |
| 2002/0029194 A1 | 3/2002 | Lewis et al. |
| 2002/0035578 A1 | 3/2002 | Stratigos et al. |
| 2002/0049624 A1 | 4/2002 | Raveis |
| 2002/0052814 A1 | 5/2002 | Ketterer |
| 2002/0059137 A1 | 5/2002 | Freeman et al. |
| 2002/0069179 A1* | 6/2002 | Slater et al. .................. 705/67 |
| 2002/0069358 A1 | 6/2002 | Silvester |
| 2002/0073020 A1 | 6/2002 | McFarland et al. |
| 2002/0078159 A1 | 6/2002 | Petrogiannis et al. |
| 2002/0091651 A1 | 7/2002 | Petrogiannis et al. |
| 2002/0116321 A1 | 8/2002 | Areheart |
| 2002/0116331 A1 | 8/2002 | Cataline et al. |
| 2002/0116531 A1 | 8/2002 | Chu |
| 2002/0128969 A1 | 9/2002 | Parmelee et al. |
| 2002/0129256 A1 | 9/2002 | Parmelee et al. |
| 2002/0129257 A1 | 9/2002 | Parmelee et al. |
| 2002/0143711 A1 | 10/2002 | Nassiri |
| 2002/0169702 A1 | 11/2002 | Eaton, Jr. et al. |
| 2002/0178035 A1 | 11/2002 | Lajouanie |
| 2003/0009418 A1 | 1/2003 | Green et al. |
| 2003/0036994 A1 | 2/2003 | Witzig et al. |
| 2003/0055783 A1 | 3/2003 | Cataline et al. |
| 2003/0074297 A1 | 4/2003 | Carragher |
| 2003/0110400 A1 | 6/2003 | Cartmell et al. |
| 2003/0120588 A1 | 6/2003 | Dodd et al. |
| 2003/0144948 A1 | 7/2003 | Cleary et al. |
| 2003/0158811 A1 | 8/2003 | Sanders et al. |
| 2003/0172296 A1 | 9/2003 | Gunter |
| 2003/0172297 A1 | 9/2003 | Gunter |
| 2003/0172298 A1 | 9/2003 | Gunter et al. |
| 2003/0172299 A1 | 9/2003 | Gunter |
| 2003/0177071 A1 | 9/2003 | Treese et al. |
| 2003/0182151 A1 | 9/2003 | Taslitz |
| 2003/0208557 A1 | 11/2003 | Higbee |
| 2003/0225688 A1 | 12/2003 | Dobbins |
| 2003/0233418 A1 | 12/2003 | Goldman |
| 2004/0111619 A1 | 6/2004 | Laurie et al. |

FOREIGN PATENT DOCUMENTS

| | | |
|---|---|---|
| WO | WO0008541 | 2/2000 |
| WO | WO0019296 | 4/2000 |
| WO | WO0019315 | 4/2000 |
| WO | WO0049521 | 8/2000 |
| WO | WO0062140 | 10/2000 |
| WO | WO0127832 | 4/2001 |
| WO | WO0201479 | 1/2002 |
| WO | WO0203174 | 1/2002 |
| WO | WO0203774 | 1/2002 |
| WO | WO0221383 | 3/2002 |
| WO | WO0237367 | 5/2002 |
| WO | WO0237386 | 5/2002 |
| WO | WO02063431 | 8/2002 |
| WO | WO0275575 | 9/2002 |
| WO | WO02075615 | 9/2002 |
| WO | WO02075616 | 9/2002 |
| WO | WO02075617 | 9/2002 |
| WO | WO02075618 | 9/2002 |
| WO | WO03077130 | 9/2003 |

* cited by examiner

```xml
<?xml version="1.0" encoding="UTF-8"?>
<!DOCTYPE ELECTRONICDOC SYSTEM "electronicdoc_V1.dtd">
<ELECTRONICDOC DocId="MD01">
    <HEADER>
        <NAME Type="Note" State="Signable" Negotiable="True" MustBeRecorded="False"/>
        <STRUCT_MODEL xlink:type="extended" Content="Static" xlink:title="Note-Sample">
            <PART Id="P01" xlink:role="Data" Storage="Local" Xpath="//DATA" xlink:title="Assignment-Data"/>
            <PART Id="P02" xlink:role="View" Storage="Local" Xpath="id('View01')" xlink:title="Assignment-Data"/>
        </STRUCT_MODEL>
        <AUDIT_TRAIL>
            <ENTRY Logger="Joe Smith" Action="Template" DateTime=
                "2000-12-08 14:54:00"/>
            <ENTRY Logger="Doc Prep" Action="Populated"
                DateTime="2001-05-09T09:30:01"/>
            <ENTRY Logger="Doc Prep" Action="Signable"
                DateTime="2001-05-09T09:31:23"/>
        </AUDIT_TRAIL>
        <SIG_MODEL>
            <SIGNER Areas="BorrowersAreas01" Role="Borrower" RoleOrder="1" Type="Text"
                Targets="Borrower01" Area="BorrowerArea01" Signature="Borrower01Sig"/>
            <SIGNER Role="TamperSeal" Type="Dsig" Targets="View01 Data01"
                Signature="TamperSeal01"/>
        </SIG_MODEL>
    </HEADER>
    <DATA Id="Data01">
        <MAIN>
            <LOAN><MORTGAGE_TERMS InterestRatePercent="6"/></LOAN>
            <BORROWER _FirstName="Rebecca" _MiddleName="Kate"
                _LastName="Thornton"/>
        </MAIN>
        <MAP Target="View01">
            <ARC DataEnd="//MORTGAGE_TERMS/@InterestRatePercent"
                ViewEnd="id(InterestRate)"/>
            <ARC DataEnd="//BORROWER/@_FirstName" ViewEnd="id(BorrowerNameFirst)"/>
            <ARC DataEnd="//BORROWER/@_MiddleName"
                ViewEnd="id(BorrowerNameMiddle)"/>
            <ARC DataEnd="//BORROWER/@_LastName" ViewEnd="id(BorrowerNameLast)"/>
        </MAP>
    </DATA>
    <VIEW Id="View01" MimeType="text/html" Tagged="True">
        <SIG_TARGET Id="Borrower01">
            <html>
                <head>
                    <title> NOTE </title>
                </head>
                <body>
                    I will pay interest at a yearly rate of
                        <span class="underlinedata" id="InterestRate">6</span>%. <br/>
                    <SIG_AREAS Id="BorrowersAreas01">
                        <SIG_AREA Id="BorrowerArea01">
                            <SIG_ABOVE> Borrower </SIG_ABOVE>
                            <br/>
                            <SIG_LINE Id="BorrowerSig01">

</SIG_LINE> <br />
                            <SIG_BELOW>
                                <span id="BorrowerNameFirst">Rebecca</span>
                                <span id="BorrowerNameMiddle">Kate</span>
                                <span id="BorrowerNameLast">Thornton</span>
                            </SIG_BELOW>
                            <br/>
                        </SIG_AREA>
                    </SIG_AREAS>
                </body>
            </html>
        </SIG_TARGET>
    </VIEW>
</ELECTRONICDOC>
```

*FIG. 4*

```xml
<?xml version="1.0" encoding="UTF-8"?>
<!DOCTYPE ELECTRONICDOC SYSTEM "smartdoc_V1.dtd">
<ELECTRONICDOC DocId="MD01">
    <HEADER>
        <NAME Type="Note" State="Signed" Negotiable="True" MustBeRecorded="False"/>
        <STRUCT_MODEL xlink:type="extended" Content="Static" xlink:title="Note-Sample">
            <PART Id="P01" xlink:role="Data" Storage="Local" Xpath="//DATA"
                    xlink:title="Assignment-Data"/>
            <PART Id="P02" xlink:role="View" Storage="Local" Xpath="id('View01')"
                    xlink:title="Assignment-Data"/>
        </STRUCT_MODEL>
        <AUDIT_TRAIL>
            <ENTRY Logger="Joe Smith" Action="Template" DateTime="2000-12-08 14:54:00"/>
            <ENTRY Logger="Doc Prep" Action="Populated" DateTime="2001-05-09T09:30:01"/>
            <ENTRY Logger="Doc Prep" Action="Signable" DateTime="2001-05-09T09:31:23"/>
        </AUDIT_TRAIL>
        <SIG_MODEL>
            <SIGNER Areas="BorrowersAreas01" Role="Borrower" RoleOrder="1" Type="Text"
                    Targets="Borrower01" Area="BorrowerArea01" Signature="Borrower01Sig"/>
            <SIGNER Role="TamperSeal" Type="Dsig" Targets="View01 Data01"
                    Signature="TamperSeal01"/>
        </SIG_MODEL>
    </HEADER>
    <DATA Id="Data01">
        <MAIN>
            <LOAN><MORTGAGE_TERMS InterestRatePercent="6"/></LOAN>
            <BORROWER _FirstName="Rebecca" _MiddleName="Kate" _LastName="Thornton"/>
        </MAIN>
        <MAP Target="View01">
            <ARC DataEnd="//MORTGAGE_TERMS/@InterestRatePercent" ViewEnd="id(InterestRate)"/>
            <ARC DataEnd="//BORROWER/@_FirstName" ViewEnd="id(BorrowerNameFirst)"/>
            <ARC DataEnd="//BORROWER/@_MiddleName" ViewEnd="id(BorrowerNameMiddle)"/>
            <ARC DataEnd="//BORROWER/@_LastName" ViewEnd="id(BorrowerNameLast)"/>
        </MAP>
    </DATA>
    <VIEW Id="View01" MimeType="text/html" Tagged="True">
        <SIG_TARGET Id="Borrower01">
            <html>
                <head>
                    <title> NOTE </title>
                </head>
                <body>
                    I will pay interest at a yearly rate of <span class="underlinedata"
                        id="InterestRate">6</span>%. <br/>
                    <SIG_AREAS Id="BorrowersAreas01">
                        <SIG_AREA Id="BorrowerArea01">
                            <SIG_ABOVE> Borrower </SIG_ABOVE>
                            <br/>
                            <SIG_TEXT Id="Borrower01Sig">
                                eSigned by Rebecca Thornton at 3:46 on 11/16/2001</SIG_TEXT>
                            <SIG_BELOW>
                                <span id="BorrowerNameFirst">Rebecca</span>
                                <span id="BorrowerNameMiddle">Kate</span>
                                <span id="BorrowerNameLast">Thornton</span>
                            </SIG_BELOW>
                            <br/>
                        </SIG_AREA>
                    </SIG_AREAS>
                </body>
            </html>
        </SIG_TARGET>
    </VIEW>
```

*FIG. 5A*

```
<SIGNATURES>                                                                    400
    <Signature xmlns="http://www.w3.org/2000/09/xmldsig#" Id="TamperSeal01">
    <SignedInfo>
        <CanonicalizationMethod Algorithm="http://www.w3.org/TR/2001/REC-xml-c14n-
            20010315#WithComments"/>
        <SignatureMethod Algorithm="http://www.w3.org/2000/09/xmldsig#rsa-sha1"/>
        <Reference URI="#View01">
            <DigestMethod Algorithm="http://www.w3.org/2000/09/xmldsig#sha1"/>
            <DigestValue>53PyDuu+d43/T65i5rt</DigestValue>
        </Reference>
        <Reference URI="#Data01">
            <DigestMethod Algorithm="http://www.w3.org/2000/09/xmldsig#sha1"/>
            <DigestValue>53PyDuu+d43/T65i5rt</DigestValue>
        </Reference>
    </SignedInfo>
    <SignatureValue>juS5RhJ884qoFR8flVXd/rbrSDVGn40CapgB7qeQiT+rr0NekEQ
        6BHhUA8dT3+BCTBUQI0dBjlml9lwzENXvS83zRECjzXbMRTUtVZiPZG2pqKPnL2Y
        U3A9645UCjTXU+jgFumv7k78hieAGDzNci+PQ9KRmm//icT7JaYztgt4=</SignatureValue>
    <KeyInfo>
        <KeyValue>
450         <RSAKeyValue>
                <Modulus>uCiukpgOaOmrq1fPUTH3CAXxuFmPjsmS4jnTKxrv0w1JKcXtJ2M3aka
                    V1d/karvJlmeao20jNy9r+/vKwibjM77F+3blkeMEGmAlUnFciJkR+ihO7b4cTuYnEi8
                    xHtu4iMn6GODBoEzqFQYdd8p4vrZBsvs44nTrS8qyyhba648=</Modulus>
                <Exponent>AQAB</Exponent>
            </RSAKeyValue>
        </KeyValue>
        <X509Data>
            <X509SubjectName>CN=Smith Bill,O=First
                National,L=McLean,ST=Virginia,C=US</X509SubjectName>
            <X509IssuerSerial>
                <X509IssuerName>CN=Smith Bill,O=First
                    National,L=McLean,ST=Virginia,C=US</X509IssuerName>
                <X509SerialNumber>970849928</X509SerialNumber>
            </X509IssuerSerial>
            <X509Certificate>MIICeDCCAeGgAwIBAgIEOd3+iDANBgkqhkiG9w0BAQQFADBbM
                ...
                8HU2sUVZOa90c0mJl2vJs/RwyLW7/uCAfC/l/k9xGr7fneolW
            </X509Certificate>
        </X509Data>
    </KeyInfo>
    </Signature>
</SIGNATURES>
</ELECTRONICDOC>
```

FIG. 5B

```
<?xml version="1.0" encoding="UTF-8"?>

<!--Title: electronic mortgage ELECTRONICDOC Document DTD
Description: This DTD contains the top level element ELECTRONICDOC as well as
definitions for the parts of the electronic document -->

<!-- include supporting DTDs -->
<!ENTITY % emrtgent-include SYSTEM "electronicdoc_V1.ent">
%emrtgent-include;
<!ENTITY % manifest "IGNORE">
<!ENTITY % electronicdoc "INCLUDE">
<!ENTITY % sdcore-include SYSTEM "electronicdoc _core_V1.dtd">
%sdcore-include;
<!ENTITY % dsig-include SYSTEM "xmldsig-core-schema-electronicdoc _V1.dtd">
%dsig-include;
<!-- include *modified* XHTML 1.0 Transitional DTD -->
<!ENTITY % html-include SYSTEM "xhtml1-transitional-electronicdoc_V1.dtd">
%html-include;
<!-- include Mortgage Data DTD -->
<!ENTITY % emrtg-include SYSTEM "mortgage_documents_V1.dtd">
%emrtg-include;
<!-- Entities specific to ELECTRONICDOC -->
<!ENTITY % html-block "html | span | div | table">

<!-- A SigContent can include an HTML block entity from the xhtml1-transitional-
        mortgage_V1.dtd.  Note:  block entity defined in xhtml1-transitional-
        mortgage_V1.dtd includes the sig model elements -->

<!ENTITY % sigContent "#PCDATA | html | %block; | form | %inline; | %misc; | td |
        th | ENDORSEMENT_AREA">
<!ENTITY % viewContent "#PCDATA | %html-block; | SIG_LINE | SIG_TARGET |
        SIG_AREA | Signature | SIG_IMAGE | SIG_TEXT | SIG_OBJECT">
<!ENTITY % SASblock "%block; | %inline; | SIG_AREA">
<!ENTITY % SAblock "%block; | %inline; | tr | td | SIG_LINE | ENDORSEMENT_AREA |
        Signature | SIG_IMAGE | SIG_TEXT | SIG_OBJECT | SIG_BELOW |
        SIG_ABOVE | SIG_DATA">

<!-- ELECTRONICDOC  definition -->
<!ELEMENT ELECTRONICDOC (HEADER, ((DATA, VIEW*) | (DATA?, VIEW+)),
        SIGNATURES?)>
<!ATTLIST ELECTRONICDOC
        xmlns CDATA #FIXED "http://www.efanniemae.com/2001/emortgage"
        xmlns:xlink CDATA #FIXED "http://www.w3.org/1999/xlink"
        Version CDATA #FIXED "1.0"
        DocId CDATA #REQUIRED
        PackageId CDATA #IMPLIED>

<!ELEMENT DATA (MAIN, MAP?, CUSTOM?)>
<!ATTLIST DATA
        %iid;>
```

FIG. 6A

```
<?xml version="1.0" encoding="UTF-8"?>

<!--Title: electronic mortgage ELECTRONICDOC Document DTD
Description: This DTD contains the top level element ELECTRONICDOC as well
as definitions for the three part electronic document -->

<!-- include supporting DTDs -->
<!ENTITY % emrtgent-include SYSTEM "electronicdoc_V1.ent">
%emrtgent-include;
<!ENTITY % manifest "IGNORE">
<!ENTITY % electronicdoc "INCLUDE">
<!ENTITY % sdcore-include SYSTEM "electronicdoc _core_V1.dtd">
%sdcore-include;
<!-- Note: MAIN MUST only contain elements from the
     mortgage_documents_V1.dtd. -->
<!ELEMENT MAIN (LOAN | PROPERTY | BORROWER | LENDER | POWER_OF_ATTORNEY
        | ASSIGN_TO | ASSIGN_FROM | RETURN_TO | EXECUTION |
        ORIGINAL_TITLE_RECORDED | NOTARY | PREPARED_BY)+>
<!ELEMENT MAP ((ARC | CONVERT | OPERATOR)+)>
<!ATTLIST MAP
        Target IDREF #REQUIRED>
<!ELEMENT ARC (CONVERT?)>
<!ATTLIST ARC
        DataEnd CDATA #REQUIRED
        ViewEnd CDATA #REQUIRED>
<!ELEMENT CONVERT (ARC*)>
<!ATTLIST CONVERT
        Type (ConvertType | FillMask) #REQUIRED
        DataEndType CDATA #IMPLIED
        ViewEndType CDATA #IMPLIED
        Mask CDATA #IMPLIED>
<!ELEMENT OPERATOR (OPERATOR | ARC)+>
<!ATTLIST OPERATOR
        Type (AND | OR) #REQUIRED>
<!ELEMENT CUSTOM (#PCDATA)>
<!ELEMENT VIEW (%viewContent;)*>
<!ATTLIST VIEW
        %rid;
        Href CDATA #IMPLIED
        Encoding (Base64 | Base16) #IMPLIED
        Tagged (True | False) "False"
        MimeType CDATA #REQUIRED>
<!ELEMENT SIG_TARGET (%sigContent;)*>
<!ATTLIST SIG_TARGET
        %rid;>

<!-- The SigTarget tag will wrap the Signed content and
optionally other Signed/Signature pairs. -->
<!ELEMENT SIG_LINE (#PCDATA)>
<!ATTLIST SIG_LINE
        %rid;>
<!ELEMENT ENDORSEMENT_AREA EMPTY>
<!ATTLIST ENDORSEMENT_AREA
        %rid; >
```

*FIG. 6B*

```
<!-- The Signature element is Included via
     dsig-include entity reference. -->
<!ELEMENT SIG_AREA (#PCDATA | %SAblock;)*>
<!ATTLIST SIG_AREA
        %rid;
>
<!ELEMENT SIG_IMAGE (#PCDATA | img)*>
<!ATTLIST SIG_IMAGE
        %rid;
        MimeType CDATA #REQUIRED
        Encoding CDATA #REQUIRED
        Href CDATA #IMPLIED
>
<!ELEMENT SIG_TEXT (#PCDATA)>
<!ATTLIST SIG_TEXT
        %rid;
>
<!ELEMENT SIG_OBJECT (#PCDATA)>
<!ATTLIST SIG_OBJECT
        %rid;
        MimeType CDATA #REQUIRED
        Encoding CDATA #REQUIRED
        Href CDATA #IMPLIED
>
<!ELEMENT SIG_AREAS (%SASblock;)*>
<!ATTLIST SIG_AREAS
        %rid;
>
<!ELEMENT SIG_ABOVE (#PCDATA | span)*>
<!ELEMENT SIG_BELOW (#PCDATA | span)*>
<!ELEMENT SIG_DATA (#PCDATA)>
<!ELEMENT SIGNATURES (SIG_DATA | SIG_TEXT | SIG_IMAGE | SIG_OBJECT | Signature)*>
```

*FIG. 6C*

```
<STRUCT_MODEL xlink:type="extended" Content= "Static"
         Storage= "Standalone"
         xlink:title= "Note-Form3200" >
    <Parent xlink:role= "DeliveryPackage"
         Storage = "Remote"
         xlink:href= "jar://closing.jar#/META/manifest.xml"
         Xpath = "//STRUCT_MODEL" />
    <Part xlink:role= "Data" Xpath= "//DATA"
         Storage = "Local"
         xlink:title="Note-Data" />
    <Part xlink:role= "View" Xpath= "id(V01)"
         Storage = "Local"
         xlink:title = "XHTML Note" />
</STRUCT_MODEL>
```

FIG. 8

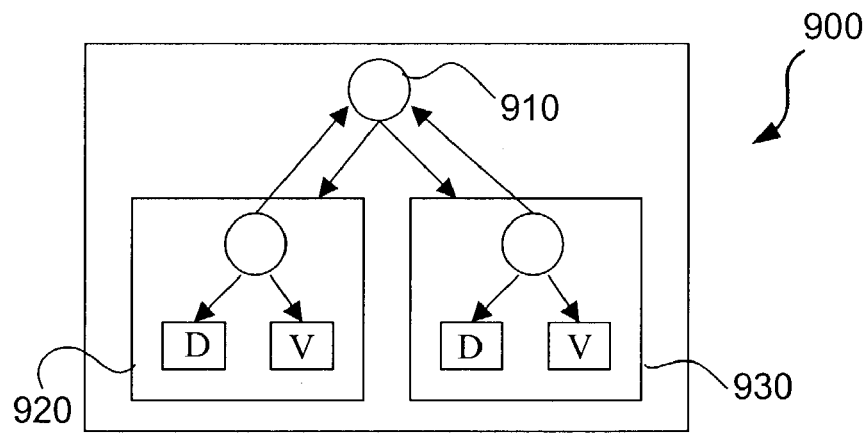

FIG. 9

```
<STRUCT_MODEL xlink:type="extended" Content= "Dynamic"
1110              Storage= "Mixed" xlink:title = "FloodReport" >
     <Parent xlink:role= "ClosingPackage"
1120             Storage = "Remote"
                 xlink:href= "jar://closing.jar#/META/manifest.xml"
                 Xpath="//STRUCT_MODEL"   />
     <Part xlink:role= "Data"
1130             Storage = "Remote"
                 xlink:href= "jar://closing.jar#/DocSet.xml"
                 Xpath = "//FloodReport"
                 xlink:title="FloodReport-Data" />
     <Part xlink:role= "ViewTemplate"
1140             Storage = "Local"
                 Xpath = "id(T01)" />
</STRUCT_MODEL>
```

*FIG. 11*

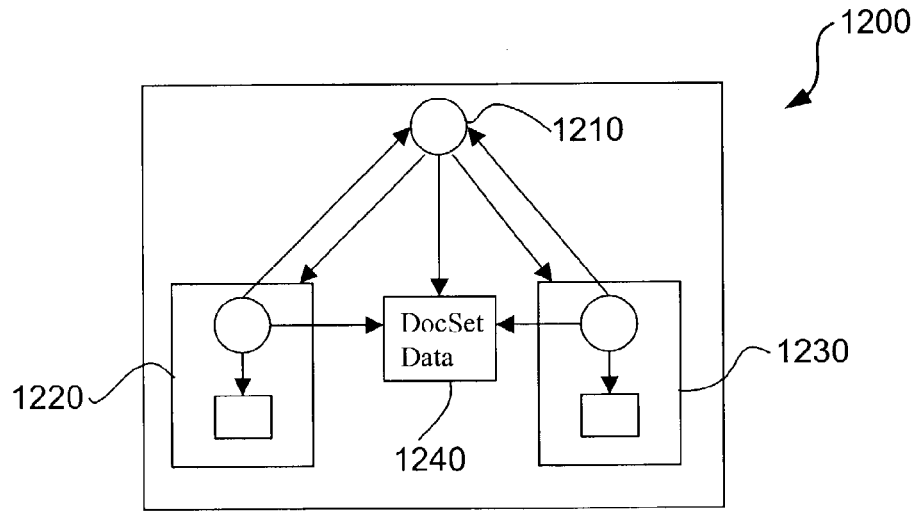

*FIG. 12*

```
<?xml version="1.0" encoding="UTF-8"?>
<!-- Common attributes -->
<!ENTITY % operatorEnum "EQ | NE | GT | LT | GE | LE">
<!ENTITY % rselect "select CDATA #REQUIRED">
<!ENTITY % rmatch "match CDATA #REQUIRED">
<!ENTITY % rid "id ID #REQUIRED">
<!ENTITY % rtrigger "trigger IDREF #IMPLIED">
<!ENTITY % report "
    name CDATA #REQUIRED
    error CDATA #IMPLIED">
<!-- ValidationSuite is the root element. -->
<!ELEMENT ValidationSuite (RuleSet+, Triggers?)>
<!ATTLIST ValidationSuite
        type CDATA #REQUIRED
        %report;>
<!ELEMENT RuleSet
        (       ComparisonRule |
                MembershipRule |
                IdrefRule |
                GroupComparisonRule)+>
<!ATTLIST RuleSet
    %rtrigger;
        %report;>
<!ELEMENT ComparisonRule (ForEach | ForEachChild | (Value, Operator, Value))>
<!ATTLIST ComparisonRule
    %rtrigger;
        %report;>
<!ELEMENT MembershipRule (Member+)>
<!ATTLIST MembershipRule
        %rtrigger;
        %report;>
<!ELEMENT IdrefRule (ForEach?)>
<!ATTLIST IdrefRule
        %rtrigger;
        %report;>
<!ELEMENT GroupComparisonRule (ForEach?)>
<!ATTLIST GroupComparisonRule
    %rtrigger;
        %report;>
<!ELEMENT Triggers
        (       PresenceTrigger |
                ComparisonTrigger |
                ConversionTriggers)+>
<!ELEMENT Value EMPTY>
<!ATTLIST Value
        type (Literal | Ref) "Literal"
        id ID #IMPLIED
        %rselect;
        ref (Xpath | Idref | Xpointer) #IMPLIED
        %report;>
<!ELEMENT Operator EMPTY>
<!ATTLIST Operator
        type (%operatorEnum;) #REQUIRED
        %report;>
```

```
<!ELEMENT PresenceTrigger EMPTY>
<!ATTLIST PresenceTrigger
        %rid;
        %rmatch;
        %report;>
<!ELEMENT ComparisonTrigger EMPTY>
<!ATTLIST ComparisonTrigger
        %rid;
        %rselect;
        literal CDATA #REQUIRED
        operator (%operatorEnum;) #REQUIRED
        %report;>
<!ELEMENT ConversionTriggers (TypeConversionTrigger, FillMaskConversionTrigger)>
<!ATTLIST ConversionTriggers
        %rid;
        %rselect;
        %report;>
<!ELEMENT TypeConversionTrigger (TypeRef, TypeRef)>
<!ATTLIST TypeConversionTrigger
        %rid;
        %rselect;
        %report;>
<!ELEMENT FillMaskConversionTrigger (TypeRef, ForEach?)>
<!ATTLIST FillMaskConversionTrigger
        %rid;
        %rselect;
        %report;>
<!ELEMENT ForEach ((Value, Operator, Value) | Idref+)>
<!ATTLIST ForEach
        %rtrigger;
        %rselect;
        %report;>
<!ELEMENT ForEachChild ((Value, Operator, Value) | Idref+)>
<!ATTLIST ForEachChild
        %rtrigger;
        %report;>
<!ELEMENT Member EMPTY>
<!ATTLIST Member
        %rselect;
        %report;>
<!ELEMENT Idref EMPTY>
<!ATTLIST Idref
        %rselect;
        tgtElemName NMTOKEN #REQUIRED
        %report;>
<!ELEMENT TypeRef EMPTY>
<!ATTLIST TypeRef
        %rselect;
        applyTo IDREF #REQUIRED
        %report;>
```

*FIG. 13B*

```xml
<?xml version="1.0" encoding="UTF-8"?>
<!DOCTYPE ValidationSuite SYSTEM "validationsuite.dtd">
<ValidationSuite
   type="emortgage_V1.dtd"
   name="3-Part SPEC Validation Suite"
>
        <RuleSet name="MAP Section Validation" trigger="DataMapTrigger">
            <ComparisonRule
               name="Map comparison rule"
               error="The map comparison rule failed."
            >
                <ForEachChild
                        trigger="ConversionTriggers"
                      name="Map Entries"
                      error="The map entries are missing."
                >
                    <Value
                       type="Ref"
                       id="DataVal"
                            select="@DataEnd"
                            ref="Xpath"
                       name="Data Value"
                       error="is missing or has no value"
                    />
                    <Operator
                       type="EQ"
                       name="Equal To"
                       error="is not equal to"
                    />
                    <Value
                       type="Ref"
                       id="ViewVal"
                            select="@ViewEnd"
                            ref="Xpath"
                       name="View Value"
                       error="is missing or has no value"
                    />
                </ForEachChild>
            </ComparisonRule>
        </RuleSet>
```

```
<RuleSet name="Signature Model Validation" trigger="SigModelTrigger">
    <IdrefRule
        name="Signature Validation Rule"
        error="The signature validation rule failed."
    >       <ForEach
                select="SIGNER"
                name="Signer Section"
                error="The signer section is missing."
            >       <Idref
                        select="@SigTargets"
                            tgtElemName="SIG_TARGET"
                        name="Signature Target"
                        error="is missing"
                /><Idref
                        select="@SigLine"
                            tgtElemName="SIG_LINE"
                        name="Signature Line"
                        error="is missing"
                /><Idref
                        select="@Signature"
                            tgtElemName="Signature"
                        name="Signature"
                        error="is missing"
                />
        </ForEach>
    </IdrefRule>
</RuleSet>
<RuleSet name="Note Validation">
    <MembershipRule trigger="DataMainTrigger"
        name="Do the following items exist in the main data section?"
        error="The note membership rule failed."
    >       <Member
                select="//MORTGAGE_TERMS"
                name="Mortgage Terms"
                error="The mortgage terms do not exist in the main data section."
            />
            <Member
                select="//LOAN_FEATURES"
                name="Loan Features"
                error="The Loan Features do not exist in the main data section."
            />
            <Member
                select="//LENDER"
                name="Lender Information"
                error="The lender information does not exist in the main data section."
            />
            <Member
                select="//BORROWER"
                name="Borrower Information"
                error="The borrower information does not exist in the main data section."
            />
            <Member
                select="//PROPERTY"
                name="Property Address"
                error="The property address does not exist in the note section."
            />
    </MembershipRule>
</RuleSet>
```

FIG. 14B

ELECTRONIC DOCUMENT VALIDATION

CROSS REFERENCE TO RELATED APPLICATIONS

This application claims priority under 35 U.S.C. § 119(e) to U.S. Provisional Application No. 60/369,030, filed Apr. 1, 2002 and entitled "System, Specification & Tools for Creating Processing, and Validating Electronic Documents," which is incorporated by reference herein in its entirety.

BACKGROUND OF THE INVENTION

1. Field of the Invention

This invention relates generally to validating documents, and more particularly to methods and apparatus for validating electronic documents used in mortgage transactions.

2. Description of the Related Art

Information is being increasingly processed electronically in lieu of traditional paper processes. Electronic documents offer substantial benefits, such as cost reduction and the accommodation of rapid manipulation and organization of information. Over the years, laws and business customs have evolved to address concerns associated with paper documents including authenticity (that a document is what it purports to be and has been actually signed by the appropriate entities), integrity (that a document is complete and unaltered), and validity (that a document complies with business and legal rules). Validation of electronic documents should address and satisfy these concerns to support the adoption of electronic documents in various environments.

Although conventional electronic documents address some of the traditional paper document concerns, they remain problematic in several respects. One problem with electronic documents is that, although they are capable of being rapidly processed, they must still integrate with environments in which their content will need to be accurately and verifiably displayed (e.g., printed, rendered on a monitor, etc.). This is particularly true for mortgage transactions, where documents such as promissory notes are still routinely used in paper form during certain procedures, such as closings. Although the data contained on a printed document could be transferred to an electronic document, in many applications such an electronic document could not be properly validated due to the lack of adequate assurances that the data contained in the electronic document actually corresponds to the printed (or otherwise viewed) document used in an underlying transaction. The printed document could be manually compared to the data in the electronic document in order to validate the electronic document, but such a practice would negate many of the benefits of electronic processing. Alternatively, a conventional markup language could be used to define an electronic document having displayable information. However, in such a case the listing for rendering a display would contain a substantial amount of information not required for subsequent data processing. Moreover, the format of the listing might not be amenable to rapid and accurate processing in many circumstances, and might not be formatted for related transactions.

Another problem with electronic document validation is the potential for document variation within an industry, as dictated by individual practices, or by the various conditions in which an electronic document might be processed. For example, in mortgage transactions, certain lenders may have a common set of requirements for document validity, but might supplement these with their own particular requirements. A conventional electronic document (e.g., an XML document) can have a specification, such as a document type definition (DTD) that identifies constraints used to determine whether the document is valid, such as whether it contains tags that are not permitted by the DTD. However, while checking for a set of known elements is known, such validation would be inadequate where divergent document requirements are encountered. Specifically, a document may be valid according to a DTD, but invalid according to the format and content required by a particular lender.

Furthermore, although conventional electronic document definitions include some general mechanisms for validating document integrity with regard to associating values to attributes (e.g. XML validation can ensure that an IDREF points to an ID that is actually defined in a document), there are not adequate assurances that actual values are appropriate for particular applications. That is, conventional validation applies a mechanical determination as to the existence of pairing, but provides no assurance that particular field and value pairings are appropriate for a given environment, and does not necessarily detect a faulty pairing.

Still further, related transactions might use separate documents that contain some common information, but which are not necessarily identical. For example, in the real estate environment, a closing will require certain documents, but related post-closing activities might require other documents. Conventional electronic document validation does not adequately address such scenarios.

Thus, what is needed is electronic document validation that verifies the correspondence of processed data to that contained on documents actually used in transactions, that is flexible in handling potentially divergent document and data requirements, and that provides greater assurances of data integrity than is provided with conventional electronic document validation.

SUMMARY OF THE INVENTION

The present invention provides improved electronic document validation.

In one aspect, electronic document validation verifies that displayable data corresponds to an underlying processed dataset. The validated electronic document has a main data portion and a view portion, wherein the main data portion can be parsed separately from the view portion, and the view portion includes presentation formatting for providing a display corresponding to the main data portion. To validate the electronic document, a set of validation rules is retrieved and applied to the electronic document. The validation rules include comparison rules for determining whether a display provided by the view portion substantially matches the main data portion. In one embodiment, substantial matching is verified for a set of values for fields required to validate a particular transaction. The comparison rules allow a determination whether certain values contained in the main data portion substantially match those found in the view portion of the electronic document.

In another aspect, linking elements that are also found in the electronic document may be used for matching the main data portion to the view portion. For a given field, a linking element identifies a main data value and a view data value, typically through pointers to fields and corresponding values in the document. Although there may be separate linking elements for each of the set of values, there may be other configurations. Sometimes, for example, a view data value appears numerous times in a viewed document. There, a single linking element might be used to verify matching to a main data value in each of numerous instances, if desired.

The linking elements can also reside in a common location, for improved access during electronic document validation, and may further reside in the main data portion.

In certain embodiments, the validation rules can also include identifier reference rules and membership rules. The identifier reference rules determine whether a value is proper for a given field, in accordance with the type of document being validated. The membership rules determine whether the electronic document includes fields required for electronic documents in a particular environment. Application of the comparison, identifier reference, and membership rules in combination facilitates a validation of an electronic document that verifies that the document includes all necessary parameters for a particular transaction, that the values for the parameters meet expectations, and that the parsed data contained in the document substantially matches the document (or other view) used by parties to a transaction involving the electronic document.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 4 illustrates an example listing for an unsigned sample electronic document;

FIGS. 5A and 5B illustrate an example listing for a signed sample electronic document;

FIGS. 6A, 6B, and 6C illustrate a sample format for an XML DTD file for an electronic document;

FIG. 8 illustrates an example listing for a static STRUCT_MODEL element;

FIG. 9 is a block diagram illustrating the structure of a Delivery Package JAR file;

FIG. 11 illustrates an example listing for a dynamic STRUCT_MODEL element;

FIG. 12 is a block diagram illustrating the structure of a Closing Package JAR file;

FIGS. 13A and 13B illustrate an example of a DTD used by the Validation Tool;

FIGS. 14A, 14B and 14C illustrate a sample format for an XML listing for the Validation Tool;

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
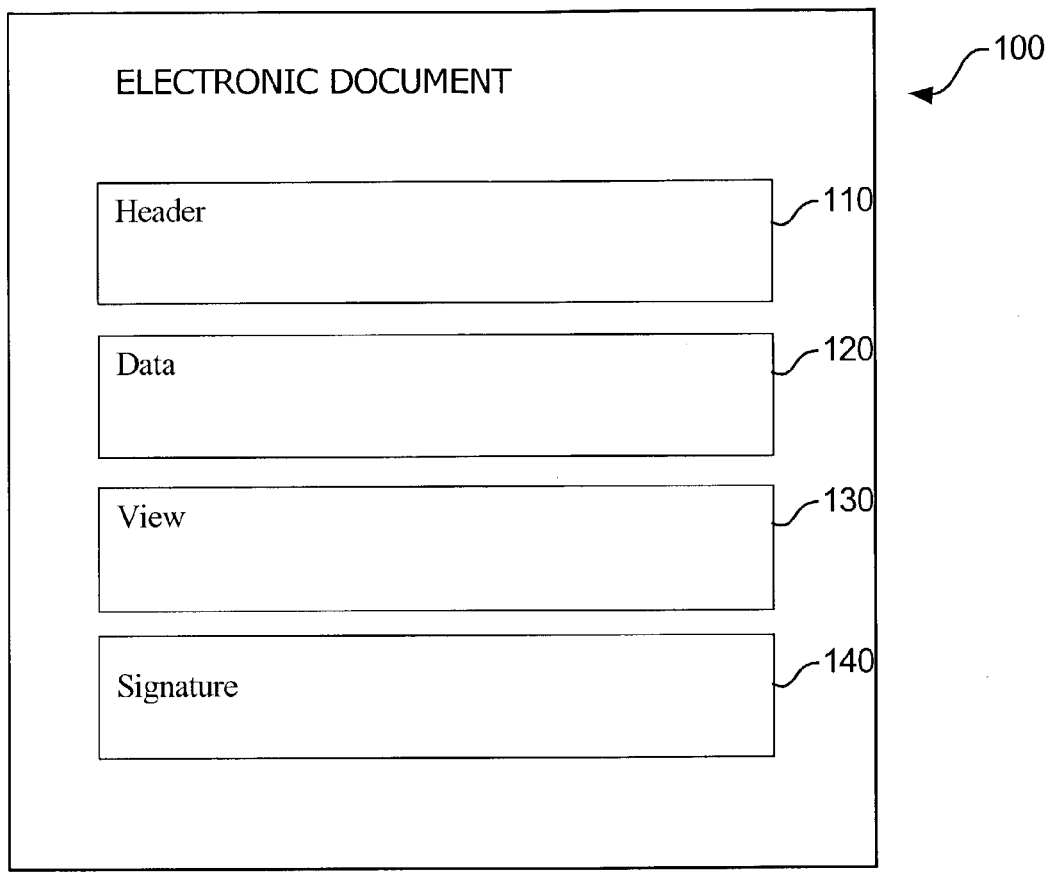
FIG. 1 is a block diagram illustrating an embodiment of an electronic document in accordance with the present invention.

FIG. 1 is a block diagram illustrating an embodiment of an electronic document 100 in accordance with the present invention. The electronic document 100 has a modular configuration including a header section 110, a data section 120, a view section 130, and a signature section 140.

The electronic document 100 is preferably defined using a mark-up language, such as the one described further below. The electronic document 100 may be used in various systems, including a computer network, including but not limited to private networks, the Internet, a local area network, and others, and may be stored on various media including but not limited to a hard disk, floppy disk, tape or compact disc. In one embodiment, validation of the electronic document 100 is variously helpful in originating, closing and delivering loans to an investor in what is referred to as the secondary mortgage market. Although mortgage transactions are described, embodiments of the present invention are also applicable elsewhere, such as for any transactions requiring a transition from static paper-based documents to an electronic format.

Preferably, the electronic document 100 facilitates tamper-proofing (e.g., ensuring that a document is not altered), non-repudiation (e.g., evidencing that a document was signed by a particular entity at a particular date and time), field validation (e.g., checking that information in a document complies with content category rules), logging (e.g., recording actions performed on the document, with actor identification), access-control (e.g., facilitating prevention of unauthorized users from accessing the document), and self-sufficiency (e.g., avoiding reliance on external software). These and other features, and corresponding validation, are described further below.

In certain applications, it might be desirable to strip one or more of header 110, data 120, view 130 and signature 140 sections from the electronic document 100 to facilitate processing, display or transmission. For example, an electronic document that is only intended for machine processing may at times only include the header 110 and data 120 sections. Likewise, an electronic document that is only intended for viewing may not contain a data 120 section (e.g., a billing statement emailed to a client). In addition, it may be desirable to replace the view 130 section with viewable electronic documents in other formats such as a PDF or an image file. Having independent data and view sections is helpful for providing flexible document structures.

Still referring to FIG. 1, the header section 110 contains information about the document itself, such as its version, the type of document (promissory note, trial transcript, etc.) and whether or not all parties have signed. The data section 120 contains the information corresponding to that originating from an equivalent paper document, such as data from a promissory note. It may also contain some non-viewable information pertaining to transactions. The view section 130 contains tags that describe how to format and present the data contained in the document. Links connect the unformatted information in the data section 120 to the corresponding formatted information in the view section 130. The header 110 and data 120 sections are preferably written in extensible markup language (XML) and the view section 130 is preferably written in extensible hypertext markup language (XHTML), which are conventional languages for creating electronic documents, although various alternative languages may be utilized. Although a single data 120 and view section 130 pair is shown, these sections can be provided in various combinations, as described further below. Generally, there may be various pairs of data and view sections for a plurality of documents defined by the electronic document, or plural view sections sharing a common data section, or other combinations.

The signature section 140 is optional, and provides the electronic and/or digital signatures for the electronic document. A preferred signatures section 140 includes four components: (1) the signers of the document, their roles and order of signing the electronic document 100; (2) for unsigned documents, signature templates that indicate where signatures are to be applied in the document, the relationship between the signer and the placeholder and how the components of a signature are presented to the signer; (3) for signed documents, a representation of the signature in either digital or electronic form and its relationship to the signer; and (4) for documents with a tamper seal, an XML digital signature verifying the content of the electronic document 100 represented in an XML digital signature. The tamper seal may also be referred to as a tamper evident seal, as it later can provide evidence whether the digital content had been altered. Significantly, some signatures may also reside in the view area.

The electronic document 100 also includes an audit trail section. This section can be independent, or part of one of the other sections, such as the header section. The audit trail section is used to log actions performed on the document, identify the person or system taking those actions, and to identify next actions for use in workflow management.

XML allows information to be structured and classified so that it is easy to tell the difference between pieces of information (e.g., a lender's telephone number, and a borrower's zip code). Particularly, XML defines the structure and classification of information in tags or elements. These tags or elements are integrated within the information itself. XML markup tags such as <LENDER> and <BORROWER> easily identify important and meaningful information about the content of the electronic document. The names of the tags and the structure of XML documents are defined by a document type definition (DTD). The DTD associated with a particular electronic document describes the tags or markup and the structure of the document, and specifies which tags contain other tags. For example, the XML tag <PROPERTY> might contains four tags <StreetAddress>, <City>, <State>, and <PostalCode>.

The World Wide Web Consortium (W3C) is the organization responsible for the XML standard, DTDs and related standards (http://www.w3.org). Notwithstanding the reference to DTDs to define the structure of XML documents, it should be understood that other specifications, methodologies, systems, protocols, or schemes could define the structure of markup languages.

Hypertext Markup Language (HTML) is the set of codes in electronic documents that allow the documents to be displayed by a World Wide Web browser. HTML documents describe the presentation of information, such as on a computer screen. HTML is related to XML; however, an HTML document is not an XML document. The W3C is also maintains the HTML standard. XHTML is essentially a reformulation of HTML that is intended to provide users with some of the functionality, extensibility and versatility of XML while maintaining the ability to display documents in a web browser. An XHTML document is an HTML document that can be viewed as a web page and can be processed by XML software. They are readily viewed, edited, and validated with standard XML tools. The can often be viewed using conventional HTML browsers, or more robustly using XHTML conforming browsers.

XHTML allows the comingling of user-defined XML tags within presentation elements. For example, in the following line of XHTML: <b><BORROWER_NAME>Joe Smith</BORROWER_NAME></b>, a BORROWER_NAME element is nested within a "b" element, which stands for "bold". Thus, the XML tag, "BORROWER_NAME", describes the contained data while the presentation tag, "b", instructs the browser on how to present the contained data (the presentation will not include any markup tags).

While XHTML is more robust and can provide the user with information concerning the data via the descriptive tags, XHTML constrains the form of the XML tags that can be embedded in the document, and requires presentation and XML data to take the same form, even if an alternate form is more suitable for later machine processing. It is therefore preferred to separate the XML tags that make up a document's structure (also called a model) from the document's presentation (also called a view).

Figure 2:
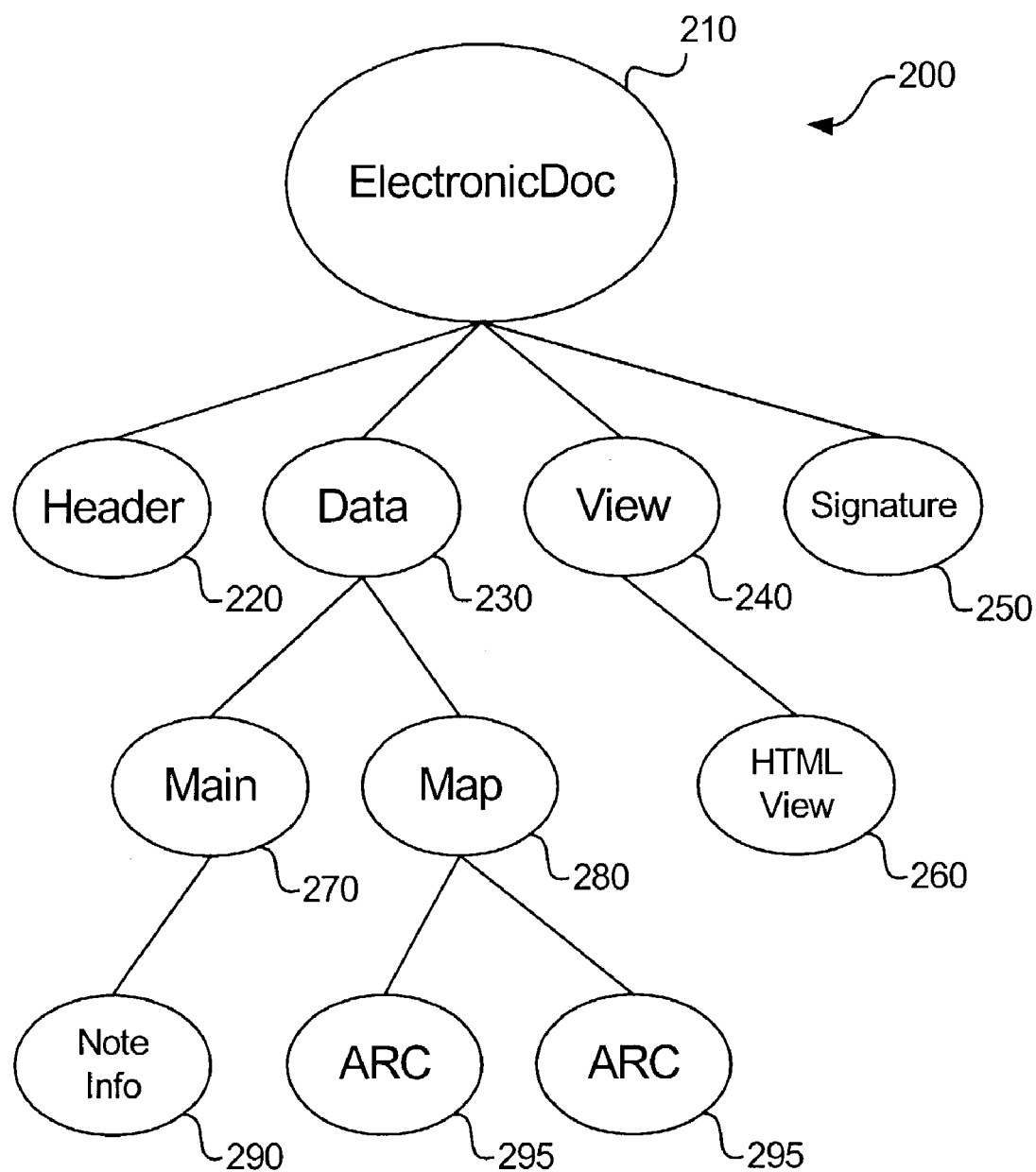
FIG. 2 is a schematic diagram illustrating the structure of the electronic document shown in FIG. 1.

FIG. 2 is a schematic diagram illustrating an embodiment of the architecture for an electronic document 200 in accordance with the present invention. The electronic document 200 includes a root element ElectronicDoc 210 having four sub-nodes or children elements: Header 220, Data 230, View 240 and Signature 250. The View element 240 has a child HTML View element 260, and the Data element 230 has two children elements, Main element 270 and Map element 280. In turn, the Main element 270 has a child element Note Info 290 and the Map element 280 has two ARC elements 295. Following are examples of electronic documents defined according to this architecture.

Figure 3:
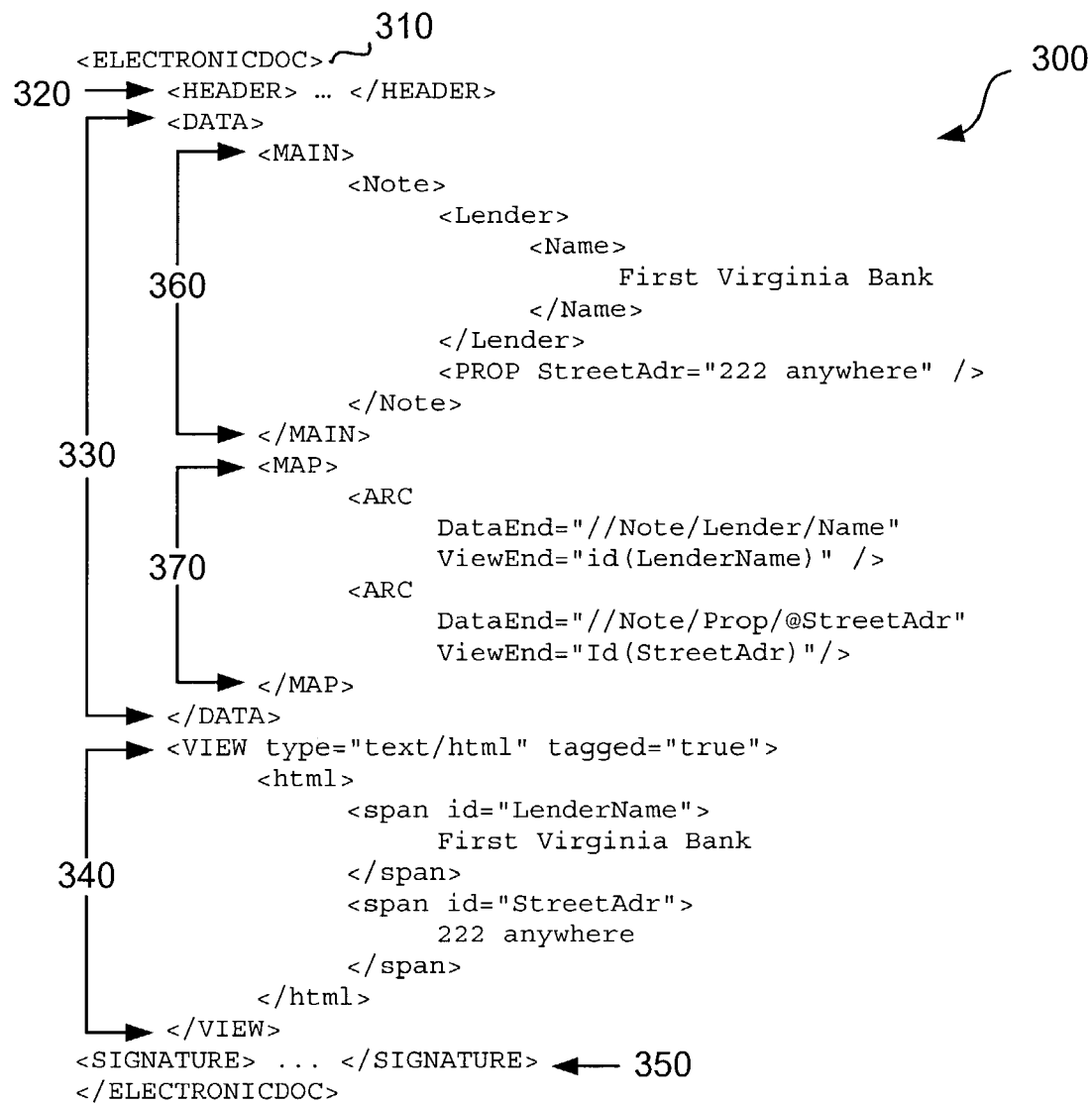
FIG. 3 illustrates an example listing for an electronic document in accordance with the present invention.

FIG. 3 illustrates a sample listing for an XML/XHTML based electronic mortgage document 300 in accordance with the architecture of FIGS. 1 and 2. Although an electronic mortgage document is shown, the present invention is equally applicable to other environments. The sample listing for the electronic document 300 includes the root element which is the ELECTRONICDOC element 310 contained between the opening tag <ELECTRONICDOC> and closing tag </ELECTRONICDOC> and its four children elements (HEADER, DATA, VIEW and SIGNATURE) that demarcate the sections of the document: the header section 320, the data section 330, the view section 340, and the signature section 350. Specifically, the header section 320 is between opening and closing tags <HEADER> and </HEADER>, the data section 330 is between opening and closing tags <DATA> and </DATA>, the view section 340 is between opening and closing tags <VIEW> and </VIEW> and the signature section 350 is between opening and closing tags <SIGNATURE> and </SIGNATURE>. The view section 340 is further subdivided into a main section 360 and a map section 370.

FIG. 4 illustrates another example of a listing for an electronic document 400, and is shown in the unsigned state, having a header section 410, data section 420, view section 430 and signature section 440. The listing for the same electronic document 400 is shown in the signed state in FIGS. 5A and 5B. The individual sections shown in FIGS. 4, 5A and 5B are discussed further below.

1. The Header Section

Preferably, the header section 420 and data section 430 are written in XML, and the view section 440 in XHTML. The header section 420 contains information about the electronic document 400 such as type, state, signature, and access information. Presenting information identifying the characteristics of the electronic document in the header section 420 allows easy determination of the content of the document 400 without having to access and analyze the main data for such determinations.

A preferred HEADER element includes NAME, AUDIT_TRAIL, SIG_MODEL element, and may further include an ACCESS_CONTROL element.

The NAME element contains information about the document's class, state, and process properties. The attributes include Type, State, Negotiable, and MustBeRecorded. The Type attribute defines the type of document(s) that the electronic document 400 defines. It can be a single document, such as a "Note" as shown. It can also be an enumerated list. Options for the type of document will vary based upon application. For mortgage transactions, the available types include Note, Addendum, Security_Instrument, Assignment, Rider, Disclosure, TIL, Itemization, RightToCancel, HUD-1, RESPA, Closing Instruction, PaymentLetter, BorrowerAffidavit, Insurance, Lender, Investor, LoanModification, DeedOffrust, and Other. The header identifies various electronic document characteristics.

The state preferably defines the document's current stage in the document lifecycle. Although various state values may be applied, in one embodiment, they include "unpopulated," wherein the document has an unpopulated data section and unpopulated and unsigned view; "populated," wherein the document has been completed with data; "signable," wherein the document is populated with data that specifies all of the proposed signers and contains placeholders for signature lines; "signed," wherein the electronic document has all of the signatures for all signers, with the exception of the recorder, and the document is tamper sealed; "recordable," which is a stage wherein the document is in a combination of signed and unsigned states, occurring when a borrower and/or notary have signed the document and it is presented for a recorder's signature; "recorded," wherein the document has all of the signatures for all signers including the recorder and is digitally tamper sealed; exported, wherein a document that is a copy or a view of an archived document is exported, while the original electronic document remains stored as an immutable archived copy; and "voided," wherein a signed or recorded document no longer has legal effect. These meta-information sub-elements and attributes are contained within the HEADER element, as shown in FIGS. 4 and 5A. Specifically, in FIG. 4 the state is indicated as "signable" and in FIG. 5A the state is indicated as "signed" since at least one person has signed the electronic document 400. Of course, the meaning of "signed" might require more than one signature to adopt that state. For example, the "signed" state might require all parties to the transaction to have signed the electronic document, including a tamper seal based signature.

Regarding the remaining attributes, the Negotiable attribute indicates whether the electronic document is a negotiable instrument or not, and the MustBeRecorded attribute is a Boolean attribute that indicates whether the electronic document must be recorded.

The AUDIT_TRAIL element contains a log of all of the actions that have been performed on the document, recording the party who performed an action, the action performed and the date and time of the action. This is useful for workflow management and for review of actions performed on the electronic document. As with the header generally, providing a specific area to inquire about audit trail information is useful in its provision of information in a well defined area, for easy determinations about type, state, and other information. In the illustrated example, the audit trail information reveals that a party denoted Joe Smith created an electronic document template, and then that a "Doc Prep" party populated the document and placed it in condition for signing (according to the above described states).

The SIG_MODEL element connects signers, targets and signatures. The illustrated element includes attributes indicating signer areas, role, targets, and tamper seal information. These attributes are described further in connection with the signature section, below.

The ACCESS_CONTROL element lists the classes of entities that may access the document. Attributes can define particular classes of entities (e.g., Lender, Notary, ClosingAgent, etc.), corresponding permissions (e.g., edit; read only; etc.), and targets for those permissions (e.g., a particular View; the entire document; etc.).

Other elements can also be provided to identify information about the electronic document. For example, a HEADER element ID can also be provided to uniquely identify the header element within the document.

2. The Data Section

The data section 430 contains the typically processed data for the electronic document (e.g., loan amounts, loan type, loan term lender's name, borrower's name and property address). Because the data section 430 does not typically contain format information, repetitions of data or lengthy signature information, it usually requires less storage than the view section 440 and the signature section 450 (the data section 430 often comprises less than fifteen percent of the electronic document). Providing the separate data section 430 is helpful to processing because computational resources are not dedicated to searching through the entire document for data, or separating data from view information.

The data section 430, which is demarcated by the DATA element, is further subdivided into a main section 460 and a map section 470 demarcated by the MAIN and MAP elements, respectively. The main section 460 contains the data model that is the XML structural description of the electronic mortgage document, which includes the XML elements corresponding to the elements in the DTD, an example of which is shown in FIG. 5. In the illustrative mortgage environment, the MAIN element comprises LOAN (the terms and features of the loan, e.g., the interest rate and loan amount), BORROWER (information about the borrower), LENDER (information about the lender), PROPERTY (information about the property which is the subject of the mortgage), and EXECUTION (information about the date and location of the execution of the note) elements.

The map section 470 links structural fields in the data section 430 to presentation fields in the view section 440. A map section 470 is used with a "tagged" view in order to link the variable data fields in the view section 440 to their counterparts in the main section 460 (which contains the XML data elements). There should be one MAP element for each view that a DATA element is linked to. For example, if an electronic document contained three different view sections representing the data from a single data section, there would be three corresponding MAP elements within the DATA element.

The MAP element includes ARC elements that link values in the view section 440 to those in the data section 430. These may also be referred to as linking elements. There are various ways that the linking element can reference the necessary values. For example, the illustrated ARC elements include a pointer to a field in the data section 430 (in an attribute called DataEnd) and a pointer to a field in the view section 440 (in an attributed called ViewEnd). Preferably, the format of these pointers conforms to the conventional W3C XPATH specification, although various alternatives can be provided and the present invention is not limited to this language or format.

ARC elements may be used for one-to-one mapping, one-to-many mapping, one-to-one data type conversion and one-to-many data type conversion. A single ARC element is used to create a one-to-one map. One way to create a one-to-many mapping uses multiple ARC elements, one for each data-to-view linkage. In this example, if an electronic document displays the first name of a borrower five times, then the MAP element contains five ARC elements, each linking the borrower's first name field from the data section to an instance of the name in the view section 440.

The format for a value displayed in the view section 440 will often differ from that in the data section 430. For example, a date may be represented numerically in the data Section 430 (e.g., "8/30/75") and in text form in the view section 440 (e.g., "Aug. 30, 1975"). When validating the document, it is helpful to convert the data into the same format for comparison (e.g., to ensure that corresponding values for fields in the view and data sections are identical).

When it is necessary to perform a data conversion, the ARC element is paired with a CONVERT element, which facilitates conversion of data types so that they are similarly formatted for comparison purposes. Various pairing configurations can be used. For example, ARC elements can be contained by a CONVERT element (typically for group conversions) or can contain a CONVERT element (typically for single conversions). The CONVERT element has three attributes: the name of the conversion process, the data type of the data in the data section, and the data type of the data in the view section. Various conversion processes can be applied. For example, the process called "ConvertType," transforms decimal numbers into text. This would be used to compare a numerical data section value (e.g., loan principal is "125000.00") with a text based view section representation (e.g., loan principal is "One Hundred Twenty Five Thousand.") Many conversion processes use masks to specify how a data field is to be compared with a data field formatted for presentation. For example, if "#" indicates an optional digit, then the following mask "$ ##,###.##" would convert 125000.00 into "$ 125,000.00."

For one-to-many data conversions, the CONVERT element contains a set of ARC elements. This allows for a conversion to map several input data fields to a single output presentation field (e.g., take a separate day, month, and year field to generate a single date display) or to map one data input field to many output presentation fields (e.g., represent the loan principal amount both numerically and in text-form in the view section).

An optional OPERATOR element may be used to specify different types of allowable conversions on data for different presentations. This optional element allows several ARC elements to be combined in Boolean fashion (i.e., with AND or OR).

A DATA element can also contain a CUSTOM element. The CUSTOM element provides users with an area to place proprietary data, new requirements data or anything that a particular system may need that does not "fit" anywhere else. As with all the XML elements, the scope of the data acceptable via the CUSTOM element is defined in the DTD. The DTD defines the scope of user-defined and user-named sub-elements to the CUSTOM element. Preferably, the CUSTOM element sits outside the MAIN element because it is designed to contain proprietary or ad hoc data.

3. The View Section

The view section 440 includes data corresponding to that contained in the XML data section 430 along with information on how to display the data. Typically, the view section and the displays created thereby are considered to be the legally binding portion of the electronic document, so the data section can be said to contain copies of data found in the view section. The view section 440 can contain multiple views, each implemented by a pairing or linking of visual formatting information and data. DATA and VIEW elements may be present in various combinations. There can be multiple pairings of DATA and VIEW elements, and multiple VIEW elements may be paired with a single DATA element.

As discussed above, the map section 470 contains the explicit links between structural fields in the data section 430 and presentation fields in the view section 440. The map section 470 is used with a "tagged" view in order to link the variable data fields in the view section 440 to their counterparts in the main section 460 (which contains the XML data elements).

The XHTML views are "tagged" by marking the variable fields. Particularly, a SPAN or DIV element can be used to tag variable data fields. The SPAN element used in this example has an ID attribute with a unique ID that can be referred to by an ARC element in the map section. As discussed above, ARC elements contain a pointer to a field in the data section 430 (in an attribute called DataEnd) and a pointer to a field in the view section 440 (in an attribute called ViewEnd). Thus, the SPAN (or DIV) element is used to envelop the data field in the view section, and to uniquely identify it using an ID attribute.

4. The Signature Section:

The signature section 450, shown in FIGS. 5A and 5B, ensures the authenticity and integrity of the electronic document 400. Various signatures, including digital and electronic signatures, may be used. For digital signatures, a Signature element according to the W3C XML Signature specification is preferably used. For electronic signatures, there are three types of signature elements: SIG_IMAGE, SIG_TEXT, and SIG_OBJECT. The SIG_IMAGE element corresponds to a locally encoded image of the person's signature or a holographic signature. The SIG_TEXT element refers to a string of text inputted by the signer. If the SIG_TEXT element is within a viewable HTML view, the text will appear. Outside of the SIG_TEXT element an application is free to style the signed text with an enclosing SPAN tag. Lastly, a SIG_OBJECT element corresponds to any external object code to be presented as an electronic signature. This would correspond to an HTML embed tag for the specific purpose of presenting a captured signature (e.g., a form of a biometric signature).

To understand the signature section 450, reference is now made to FIGS. 4, 5A and 5B which depict the listing for the electronic document 400 in the unsigned and signed states. As shown in FIGS. 4 and 5A, the header section 410 includes a SIG_MODEL element. The view section 430 contains a SIG_TARGET element and a SIG_LINE element within the VIEW element. As this listing demonstrates, parts of the signature section 450 are actually implemented within the HEADER and VIEW elements.

The <SIG_MODEL> element defines signatures provided in the electronic document and accommodates the transition from a signable state to a signed state. For each signature that is applied to the electronic document 400, the SIG_MODEL element will contain a SIGNER element. A corresponding SIG_TARGET element will exist in the view section 440 between the <VIEW> opening tag and the <VIEW> closing tag. The SIGNER and SIG_TARGET elements describe how a particular signature is to be applied to the electronic document 400.

The SIGNER elements have the following attributes: Role (defines which class of users may sign in a particular area), Roleorder (the order in which the signature should be applied relative to other signatures on the document), Type (the type of signature that will be used, e.g., digital or biometric signature), Targets (the particular SIG_TARGET within a VIEW element that is to be signed), Area (the specific SIG_AREA elements to which this SIGNER refers), Areas (the specific SIG_AREAS elements to which this SIGNER refers), Data, and Signature (the specific signature elements (electronic or digital) this SIGNER refers to).

In electronic document 400, the SIG_MODEL indicates that its corresponding SIG_TARGET will be electronically signed by a borrower, that the signature will be in text form, that it should be signed before all other signatures are applied, and that the electronic signature will be stored at the SIG_LINE with the unique identifier "BorrowerArea01." In addition, a tamper seal is applied in the form of a digital signature having as its target the entire view section identified by the unique Id "View01." The tamper seal wraps the entire view including the first applied electronic signature of the borrower.

More specifically, as shown in FIGS. 4 and 5A, the view section 440 contains the SIG_TARGET element which has the unique identifier "Borrower01." Within the SIG_TARGET is the area to be signed using the designated signature type (e.g., electronic or digital), which includes the HTML HEAD and BODY elements. The BODY element contains the text of the note and a SIG_AREAS element. The SIG_AREAS element holds all of the SIG_AREA elements for the View Section (although in this example there is only one SIG_AREA, "BorrowerArea01"). There should be one SIG_AREA for each signature that will be placed on the document. The SIG_AREA includes SIG_ABOVE (the text that goes above the signature line), SIG_LINE (the actual text representation of the signature line, which in this case is a long underscore line), and SIG_BELOW (the text that goes below the signature line). In the present example, the SIG_MODEL element indicates that this information located between the <SIG_TARGET> opening tag having the identifier "Borrower01" and the <SIG_TARGET> closing tag will be electronically signed by the borrower, Rebecca Kate Thornton, using a text-based signature.

When the electronic document 400 is signed, the SIG_MODEL element, the SIG_TARGET element and the SIG_NATURE element are modified. The SIG_TARGET element of the VIEW element is modified to depict a document where the borrower's full name has been filled in. Since the Type attribute of the SIGNER element indicates a text signature for the borrower, the SIG_LINE element is replaced by the SIG_TEXT element which contains the actual electronic signature (in this case the underscore shown in FIG. 4 is replaced with "eSigned by Rebecca Thornton at 3:46 on 11/16/2001" as shown in FIG. 5A).

The SIG_MODEL element also includes a Signature="TamperSeal01" to serve as a pointer to the signature. Once the electronic document has been signed, a SIGNATURE element is added which contains tamper sealing information in the form of an encrypted hash of the document. As shown in FIG. 5B, the digital signature tamper seal is performed using a standard PKI method. Both the digest or hash value and the key value are included between the <SIGNATURE> tags. The actual digital signature value (i.e., the value generated by encrypting the message digest with the private key is stored between opening and closing <SignatureValue> tags shown in FIG. 5B. In addition, the digital certificate including the public key of the private-public key pair is stored within the signature section 450.

FIGS. 6A, 6B, and 6C illustrate a sample format for an XML DTD file for an electronic document. The DTD includes conventional commentary syntax for explaining the function of various sections of the DTD file. The beginning of a comment is signified by "<!--" and the end of a comment is signified by "-->." "|" represents the logical expression "or," "?" signifies an optional element (zero or one of the element may be present), "*" signifies zero or more, and "+" signifies one or more.

The DTD 600 also contains Entity definitions that define the members and structures of groups. For example, the Role definition lists the various recognized roles: borrower, lender, notary, closing agent, recorder, grantor, assignor and other. The Boolean definition lists the recognized values for a Boolean, which are "true" and "false." The <ELECTRONIC DOC> element is the root of the document. The DTD specifies that electronic document 600 may contain more than one view and that the data section is optional. This means that there can be various configurations such as a header and a data section; or a header and a view; or a header, data and one or more views. This flexibility is useful for a set of mortgage documents to be packaged together where all documents do not require tagged views. The elements described in connection with the electronic document are generally provided, either directly or referentially, according to the DTD 600. Again, this DTD 600 merely suggests one possible format, and the ordinarily skilled artisan will recognize the various different options for providing an electronic document DTD according to required business practices for each particular electronic document.

FIGS. 7 through 12 illustrate an embodiment of a STRUCT_MODEL element, which is an optional element that can be used to organize the electronic document or documents, and components thereof. The STRUCT_MODEL element typically resides in the header section of an electronic document, and allows the electronic document to be split into different files and components for independent processing. For example, the STRUCT_MODEL element allows the data section and view section to be extracted into different files. Alternatively, several documents can share sub-parts. For example, many documents of lesser importance could share a single data block, reducing the data redundancy of the documents, and making their creation simpler for document preparation entities.

Figure 7:
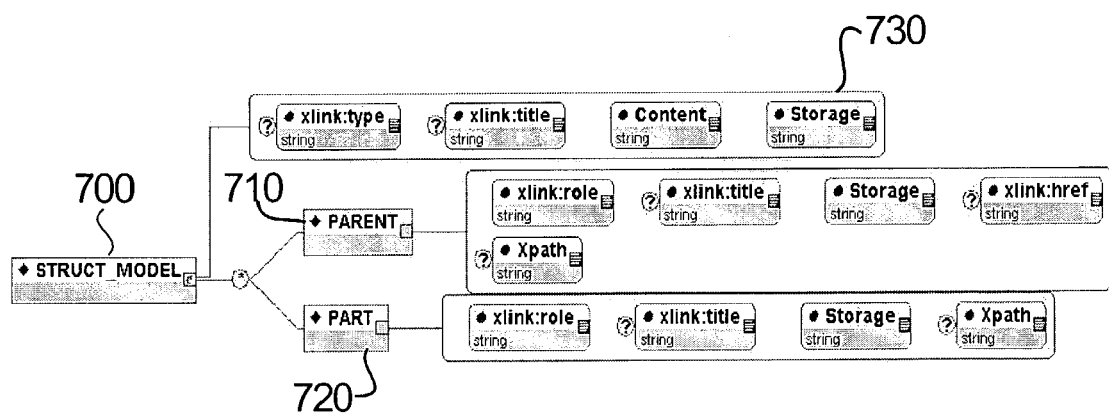
FIG. 7 is a block diagram illustrating the structure of a STRUCT_MODEL element.

FIG. 7 illustrates a STRUCT_MODEL element 700. Relationships between the document and its sub-parts are maintained by linking the PARENT element 710 and the PART element 720. The STRUCT_MODEL element 700 preferably uses XLink Version 1.0. An XLink is similar to an HTML hyperlink with several additional features such as allowing one link to reference many destination links. The previously W3C also manages the XLINK specification, which is referred to as the XML Linking Language. It allows elements to be inserted into XML documents in order to create and describe links between resources. It uses XML syntax to create structures that can describe links similar to the simple unidirectional hyperlinks of HTML, as well as more sophisticated links.

In compliance with the XLink standard, the information attributes 730 contained within the STRUCT_MODEL element 700 include XLINK:TYPE, XLINK:TITLE, CONTENT, and TYPE. The XLINK:TYPE attribute defines the type of link. In STRUCT_MODEL elements this value is "extended," meaning that it is a one-to-many link. The XLINK:TITLE attribute holds the title of the structural model. The CONTENT attribute describes how content is rendered in the given document, with "static" meaning that all information may be viewed or processed by a user and "dynamic" meaning that additional processing is required to render the content viewable by the user. The TYPE attribute describes where parts of the document are stored. This attribute has the values "Document," "Pool" or "Package."

The PARENT element 710 points to a parent container or document. A PART element 720 points to a member of the current container. A container can be an element, a file or a JAR archive file format (i.e., Java™ .jar file format). PARENT elements 710 and PART elements 720 have four common attributes: XLINK:ROLE, which defines the role of the part or parent pointed to (e.g., delivery package, view section, closing package); XLINK:TITLE, an optional attribute for specifying the title of the part or parent; STORAGE, the attribute used to describe where the part or parent is stored (locally or remotely); and XPATH, an optional attribute used to provide an Xpath expression for the location of a locally stored part.

Although the electronic document can be variously embodied and stored, it may be arranged for storage according to the JAR archive file format. This allows the bundling of multiple documents into a commonly archived file that can be digitally signed. For example, FIG. 8 is a schematic diagram illustrating the basic architecture for a delivery package 800 within a JAR file containing an electronic document representing a Note 820 and an electronic document representing an Assignment 830. The Note 820 and the Assignment 830 are preferably XML files. The Note 820 points to the JAR delivery package represented by the circle 810 as its parent, and to its data section "D" and view section "V" as parts. Similarly, the Assignment 830 points to the JAR delivery package represented by the circle 810 as its parent, and to its data section and view section as parts. The JAR delivery package 810 does not point to a parent (because it is not a sub-part of any file) and points to the Note 820 and the Assignment 830 as its parts. This allows for a clean separation of data components for storage in multiple configurations, and assigns labels for software programs to process the individual parts and aggregation of parts correctly. Various alternatives to the JAR file format can be provided, such as including files in a .zip file or using a conventional XML packaging format.

FIG. 9 is a schematic diagram illustrating the basic architecture for a delivery package 900 within a JAR file containing an electronic document representing a Note 920 and an electronic document representing an Assignment 930. The Note 920 and the Assignment 930 are preferably XML files. The Note 920 points to the JAR delivery package represented by the circle 910 as its parent, and to its data section "D" and view section "V" as parts. Similarly, the Assignment 930 points to the JAR delivery package represented by the circle 910 as its parent, and to its data section and view section as parts. The JAR delivery package 910 does not point to a parent (because it is not a sub-part of any file) and points to the Note 920 and the Assignment 930 as its parts. Thus, the structure of the Delivery Package is defined and implemented in the STRUCT_MODEL elements of the various files. This allows for a clean separation of data components for storage in multiple configurations, and assigns labels for software programs to process the individual parts and aggregation of parts correctly.

Figure 10:
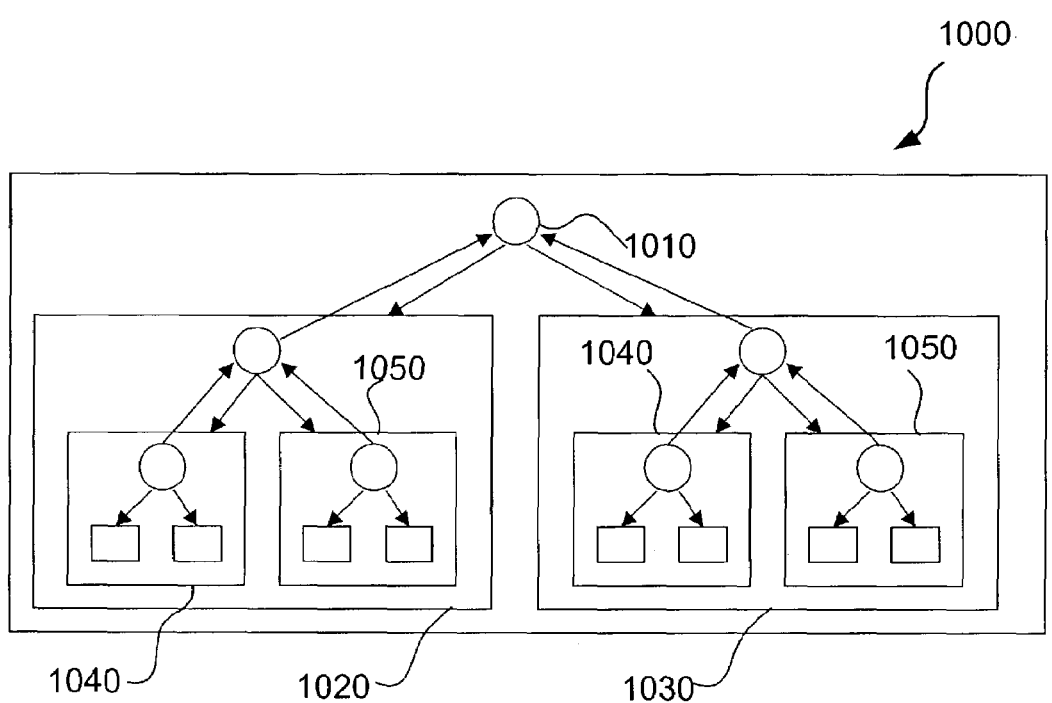
FIG. 10 is a block diagram illustrating the structure of a Set of Loans JAR file.

FIG. 10 is a schematic diagram illustrating a JAR set of loans package containing multiple loans. The JAR package for the set of loans 1000 contains multiple JAR delivery packages 1020, 1030, each of which contains a Note electronic document 1040 and an Assignment electronic document 1050. Each of these JAR delivery packages 1020, 1030 points to the set of loans JAR file represented by the circle 1010 as its parent. The set of loans JAR file 1010 points to the delivery package JAR files 1020, 1030 as its parts.

FIG. 11 illustrates an example listing for a dynamic STRUCT_MODEL element 1110 for a closing package having a container in the form of a JAR file. As described previously, the STRUCT_MODEL element contains information attributes 1110, a PARENT element 1120, a PART element 1130 for a data section of an electronic document according to the present invention, and a PART element 1140 for a view section.

FIG. 12 illustrates the structure of a closing package JAR file having a shared data section. The closing package 1200 contains two XML electronic documents 1220, 1230, both of which share the same data section 1240. Each document 1220, 1230 within the closing package 1100 contains a view section, which it points to as a part, and points to the closing package represented by the circle 1210 as a parent. The document 1220 (or 1230) and the closing package 1200 all point to the data section 1240 as a part. This structure allows multiple related documents to share their data sections or portions of their data sections. This ensures the integrity of the entire package, by eliminating the possibility of inconsistency between the various documents in the package.

As discussed in detail above, the electronic document separates format information from the underlying data, providing separate data and view sections. In one embodiment, the present invention provides electronic document validation that ensures that the visual information displayed for a user is identical to the transaction data contained within the underlying electronic document. Preferably, such validation operates in conjunction with electronic documents having separate data and view sections.

Validation in accordance with the present invention can be variously embodied. For example, embodiments include but are not necessarily limited to a method for validation; software that performs the described validation function, which may be stored on various media such as hard disks, floppy disks, optical (e.g. compact) discs or the like; a validation system including a processor that executes instructions found in a memory to perform validation; and an apparatus configured to perform validation. For ease of discussion, validation is described as being performed by a "validation tool" below.

The validation tool verifies that an electronic document is compliant with various rules. This includes checking that a document is in the proper structural format and contains all necessary information fields, confirming that the document complies with certain legal or business rules, and ensuring that there is an exact correspondence between the information in the data section and the information in the view section. In mortgage transactions, there are various sources of potential differences between document and transaction data. Inconsistencies between the data and a view are likely to be introduced at the time a document is created, as different parties with different information systems can produce documents in a mortgage set. Information is also changed in the time leading up to the closing of a mortgage, and that information may not be changed consistently throughout multiple documents and document sections.

Validation uses the DTD for the electronic document (e.g., according to the format illustrated in FIGS. 6A-C) and particular validation rules described below to validate electronic documents. If all validation tests are passed, the Validation Tool adds an entry to the AUDIT_TRAIL element (located within the Header Section) of an XML electronic document recording the successful validation.

In a first level of validation, the validation tool performs baseline validation, which is similar to standard XML parse validation that determines whether an XML document conforms to its DTD definition. For example, the electronic document must contain all necessary fields (e.g., a loan document may be required to contain a LOAN element), comply with grammatical rules (e.g., all elements must have a beginning and an end), and comply with structural rules (e.g., a loan element must contain a balance field and an interest field). In addition, unlike a conventional validating XML parser, the validation tool determines whether pointers (e.g., IDREF) points to an appropriate part of the document and accommodates appropriate data conversions (e.g., using the CONVERT elements) for data and view section comparisons.

The validation tool is preferably provided as software, although it may also be provided in hardware, firmware, or combinations thereof. The validation tool may be variously modularized according to the functionality described below. The validation tool also implements a customizable rule language and rule execution engine. The rule suite which is preferably in a java code or XML is preferably run on a computer workstation having at least 128 Mbytes of physical RAM, at least 66 Mbytes of free disk space and at least a 166 MHZ processor. The computer workstation operating system preferably supports Java 1.3.1 and Internet protocols and software. Preferably, the validation tool also operates an interactive graphical user interface, although the tool may also be implemented through other modes including but not limited to a console (command line) mode, a batch mode or a web-based mode.

Figure 14C:
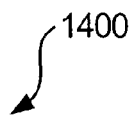

After the Validation Tool uses a document's DTD file to perform baseline validation, it loads the document's associated rule suite to perform more in depth validation by applying its own validation rules. Preferably, the validation rules are organized into rule sets, and rule sets into suites. A validation suite is a collection of rule sets targeted at a single document type. Sample formats for a rule suite DTD and a corresponding validation rule suite XML listing are respectively shown in FIGS. 13A-B and 14A-C. As indicated in FIGS. 13A-B, the DTD 1300 defines as possible elements the different types of rules in one type of rule set, namely comparison, membership, IDREF and Group Membership rules as indicated. It further describes the potential elements and attributes for the triggers and corresponding reports for each of the types of rules. FIGS. 14A-C illustrate a sample format for an XML listing 1400. The XML listing itself can be verified against a rule suite DTD, such as the one in FIGS. 13A-B, if desired.

The XML listing 1400 provides the rules that are applied to the electronic document to be validated, with the validator executing the provided rules. In some instances, the electronic document may contain additional information that is used to execute the rules. For example, the electronic document may contain the previously described ARC and CONVERT elements, which respectively identify values for comparison and modify them to accommodate the comparison. The sample listing includes a number of rule sets. Referring first to FIG. 14A, one rule set is the comparison rule set. These are triggered by the presence of and correlate to the MAP section of the electronic document. As the listing illustrates, for each ARC element in the MAP section of the electronic document, view and data values are compared to determine whether they are equal.

Other rule sets include the identifier reference "IDREF" rules, and membership rules, as illustrated in FIG. 14B. The example for the IDREF rule set shown in FIG. 14B accommodates a determination whether an electronic document in an unsigned state includes what are considered to be necessary elements. According to the provided example, the presence of SIG_TARGET, SIG_LINE, and SIGNATURE elements is required for a valid electronic document in this state. The membership rules are used to determine whether the main data section of the electronic document includes the necessary elements for the type of document being validated. The examples illustrated in FIG. 14B are MORTGAGE_TERMS, LOAN_FEATURES, LENDER, BORROWER, and PROPERTY. There will be various formats, and the elements to be checked will vary. For example, the membership rules also likely will include sub-elements. For example, in addition to generally validating the presence of the LOAN_FEATURES element, several specific loan features, such as the late fee percentage and other parameters, could also be included as elements whose presence is verified according to the membership rules.

Referring to FIG. 14C, various presence triggers will dictate whether some the previously described rule sets will be invoked against a document to be validated. For example, if the document to be validated includes the DATA/MAP element (and thus the MAP section), then the above described comparison rules are triggered. Similarly, the presence of the HEADER/SIG_MODEL element and DATA/MAIN elements respectively trigger the above described IDREF and membership rules. Other triggers can also be applied, such as those that accommodate conversion that is applied to view and/or data values to accommodate a matching comparison as described.

This listing 1400 format is merely provided as an example. The ordinarily skilled artisan can variously modify or implement different formats in order to provide the validation functionality, which is described below in connection with FIGS. 15-18. Thus, a listing might not necessarily include all of the different rule types described herein, including only one type, such as comparison rules, or another combination of types, such as comparison and membership rules without IDREF rules, depending upon the type of validation that is required or desired.

As introduced above, examples of rules that can be used by the Validation Tool are comparison rules, IDREF rules, and membership rules. These rules are described further below.

Figure 18:
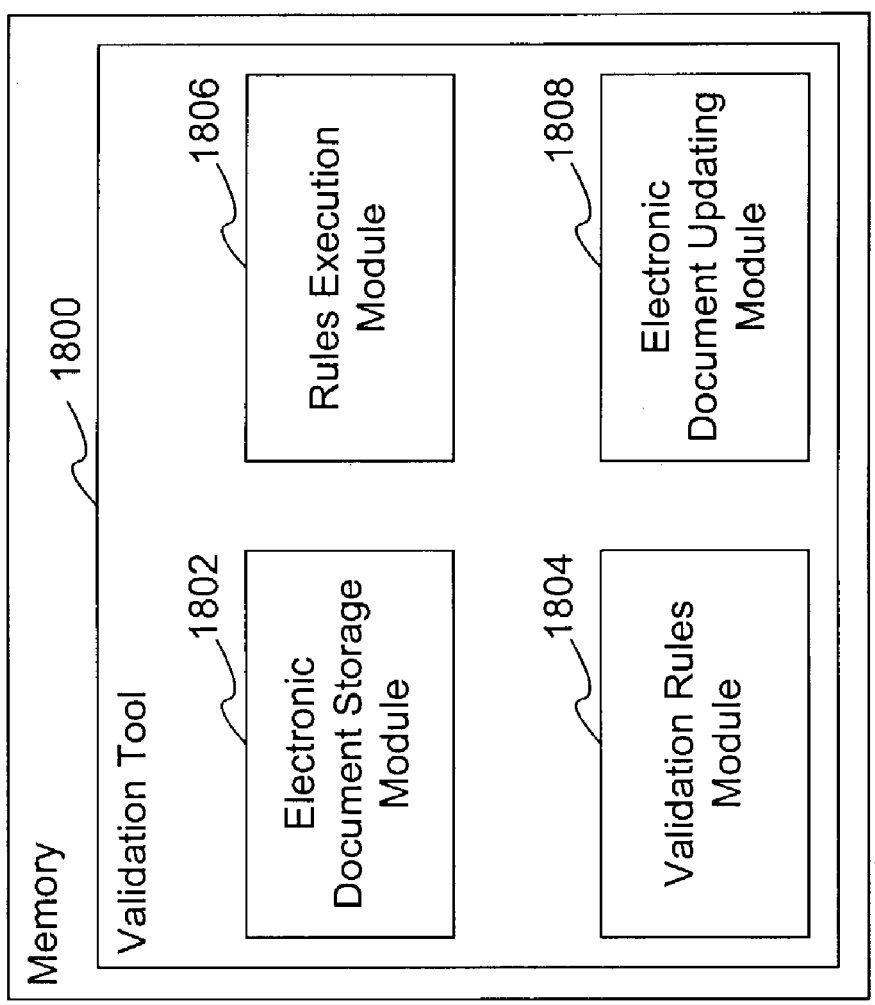
FIG. 18 is a block diagram illustrating an embodiment of a validation tool in accordance with the present invention.

FIG. 18 is a block diagram illustrating one embodiment of a Validation Tool 1800 in accordance with the present invention. The Validation Tool is shown to reside within a computer memory. As indicated above, the Tool is preferably provided as software. The software provides instructions that are executed by a conventional processor to provide the described validation functionality. Although one modular breakdown is shown, fewer or more modules can provide the same functionality. The Validation Tool 1800 includes an electronic document storage module 1802, a validation rules module 1804, a rules execution module 1806 and an electronic document updating module 1808. It may also include any necessary components for rendering displays that provide user interfaces through which users provide input to and receive output from the Validation Tool 1800 (not shown).

The electronic document storage module 1802 receives an electronic document to be validated. A preferred electronic document is described herein. That type of electronic document has a main data portion and a view portion, wherein the main data portion can be parsed separately from the view portion, and the view portion includes presentation formatting for providing displays corresponding to the main data portion. These displays are typically human readable displays (e.g, printed on paper, or shown on a computer monitor) that are used pursuant to transactions, such as promissory notes used in mortgage transactions. The electronic document can be stored for processing in conventional fashion. It may be contained in a JAR file but may be variously stored, such as in a standalone file.

The validation rules module 1804 loads a set of validation rules corresponding to the electronic document. The validation rules may be organized into suites pertaining to particular types of document, and may include various types of rules such as comparison, membership and IDREF rules. The rule suites may be stored in a separate database from which a particular suite is loaded based upon a determination of the type of electronic document being validated.

The rules execution module 1806 communicates with the validation rules module 1804 and the electronic document storage module 1802 and applies the rules to the document to determine its validity. It includes instructions for executing the validation rules, which are described further in connection with FIG. 15 below. Finally, the electronic document updating module 1808 includes instructions for updating the electronic document where it is determined that the electronic document is valid, such as by accessing information in the electronic document header and updating a state based field to indicate confirmed validity.

Figure 15:
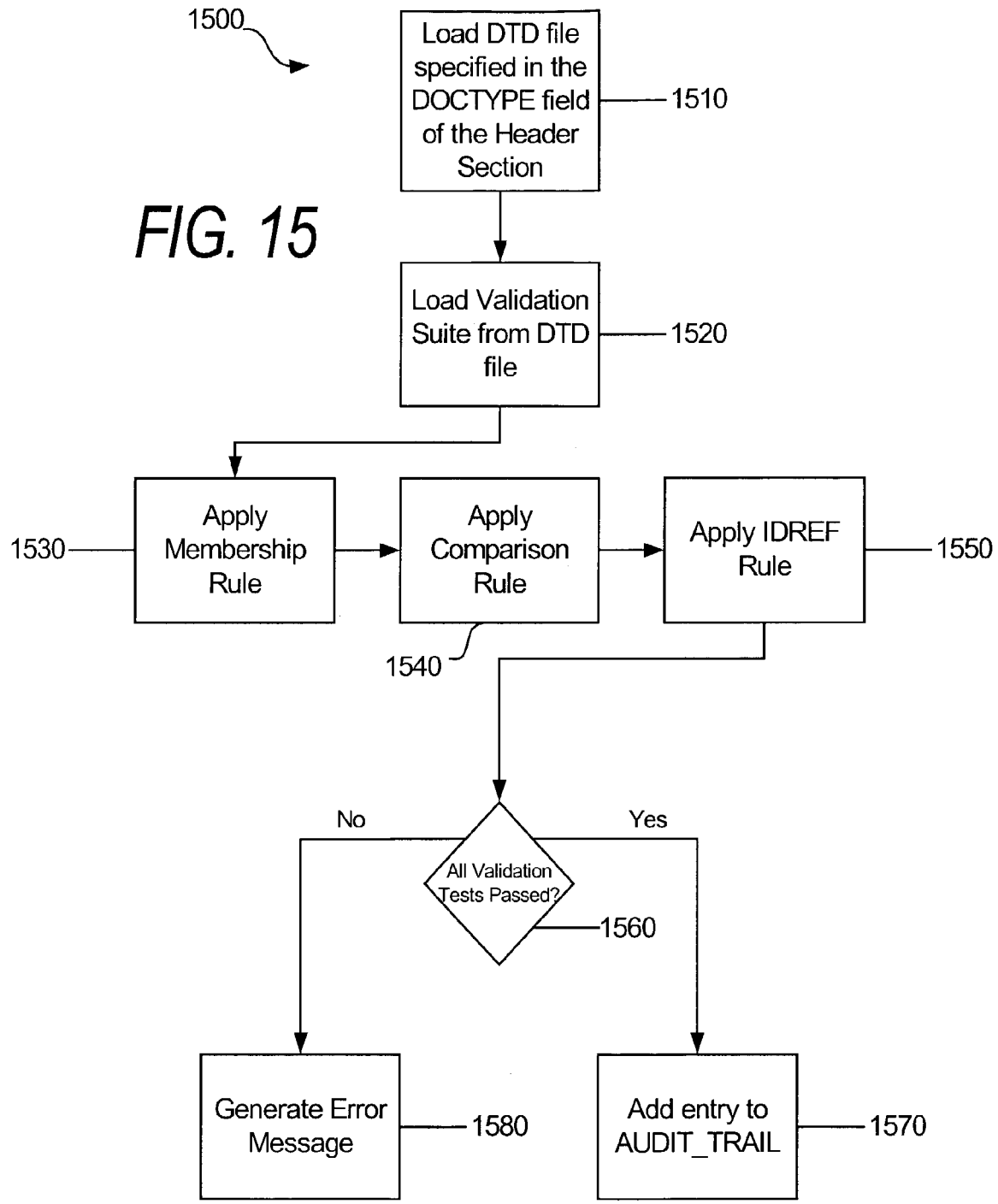
FIG. 15 is a flow diagram illustrating an embodiment of validating an electronic document in accordance with the present invention.

FIG. 15 is a flow diagram illustrating an embodiment of validating an electronic document 1500 in accordance with the present invention. The user activates the Validation Tool and selects a target document to validate. The Validation Tool initially loads 1510 a DTD appropriate for the value for the "type" field of the header section. For example, if the electronic document is indicated to be a note, then a DTD particular to the note is loaded by the Validation Tool. Additionally, as described earlier, a DTD is available for the electronic document generally. From the note validation DTD, the validation tool can load 1520 the validation rules suite particular to the note.

The Validation Tool then applies the various validation rules to the electronic document. As indicated, the Validation Tool applies 1530 membership rules to the target electronic document. The membership rules check for the presence or absence of specific fields in the document. The membership rules determine and thus verify whether the first electronic document includes a set of fields required for electronic documents in a particular environment. In their simplest form, membership rules comprise a listing of fields that act as a check off listing for the inspected document. In one embodiment, the membership rules determine whether the main data section in the electronic document includes mortgage terms, loan features, lender information, borrower information, and the property address. These in turn may include additional elements whose presence can also be validated. Various alternatives can be provided includes those with more, less or different fields of information.

Membership rules can also specify the number of instances of a field (e.g., that a certain field or element must appear one time, no times or between ten and twelve times). Furthermore, membership rules can also be based on logical statements (e.g., if a certain field is present then there must be two of another field present. For example, where a particular entity such as a borrower is present, the presence of fields pertaining to the name, address or other related is determined by the membership rules) or field values (e.g., if the state of the document is "signed note" then there must be one to three signatures present, so the membership rules determine whether such is the case).

Validation in accordance with this embodiment of the present invention also accommodates various different types of documents, each compliant with a general electronic document format. For example, a general DTD can specify as optional components all of the fields that are potentially applicable with the electronic document generally. This can be referred to as a superset of fields that are required for a plurality of environments. Initial conventional XML validation of the electronic document will not prompt a failure where optional fields are absent from the document. Then, the membership rules can be used to verify whether the particular document has its particular required fields.

The Validation Tool also applies 1540 comparison rules to the target document. The comparison rules generally are used for determining whether one or more displays provided by the view portion substantially match the main data portion of the electronic document for a given set of values. The given set of values can vary. In one embodiment, they are those values that are required for the view to be considered a legally enforceable document, which will be dictated by conventional industry practice. Although any mechanism for comparing the values in the view and data sections can be provided, in one embodiment the comparison rules engage the previously described ARC elements that define links between the two sections in an electronic document. Particularly, the ARC elements point to such values, and accessing each ARC element provides a return verification of the matching condition (or lack thereof). Alternatively, the document may merely provide pointers to fields whose values are then accessed and retrieved to conduct a comparison of view and main data values external to the document.

The ARC elements may invoke conversion elements to commonly format the data and view values for comparison. Preferably, the comparison rules ensure that there is an exact correspondence between the information in the data section and the view section. The comparison rules indicate a failure if any of the compared values are not equal or if any value is missing.

Rules provided along with (or separate from) the comparison rules may also provide additional verifications beyond mere comparison, addressing the substance of values within a document. In one embodiment, a comparison rule specifies that the date of the recordation of a document must be after the date the document was signed. Another verifies that the purchase price of a property is greater than zero.

Still referring to FIG. 15, the Validation Tool then applies 1550 IDREF rules to the target document. IDREF rules examine the IDREFs, which are pointers to sections within a document. Among other things, the Validation Tool checks that all Ids (identifications given to sections of a document) within a document are unique (e.g., that there is only one section called "View01"), that all IDs which are pointed to within the document actually exist (e.g., that if a MAP element states that the data within "Data01" is linked to "View01" that "View01" actually exists), that all IDREFs point to IDs that are in appropriate locations (e.g., that ARC elements point to portions of a View Section), and that associated values are consistent with environmental expectations (e.g., that a name, and not a number, is associated as the value for a Borrower Name field).

In addition to the above, the Validation Tool may be configured to validate tamper seals as applied during the signature process. Validation in this instance would resemble standard PKI validation wherein the message digest or hash is checked to confirm the integrity of the electronic document and the digital certificate is validated against a certification revocation list. Rules may also combine comparison, IDREF, membership and logical expressions, and activate external programs to perform some validation tasks. For example, the signature integrity rule preferably invokes a conventional digital signature verification program.

Application of each of these rule sets returns a success or failure signal. A multitude of additional rules may be applied to validate an electronic document (e.g., verifying that the digital signature contains a certificate or is compliant with a specific signature algorithm). In one embodiment, an electronic document passes validation where all of the validation tests are passed. If it is determined 1560 that all validation tests passed, then a "validation stamp" entry is added 1570 to the document's AUDIT_TRAIL field in the Header Section, denoting that the document was successfully validated. Otherwise, an error message is generated 1580 and displayed, preferably listing the tests that were failed. If the Validation Tool is operated in a batch mode, the results are stored in a simple XML format.

As indicated, multiple different displays or views can be defined in the electronic document view section. Accordingly, the above validation is potentially applicable to these different views. A different set of validation rules may apply for each, or a single set of validation rules tailored for the multiple different defined displays can be provided. Regardless, the set of validation rules can be used to determine whether the second display provided by the view portion substantially matches the main data portion for its particular set of required values, and to support indication that the first electronic document is valid upon a determination that both the first and second displays substantially match the main data portion.

Figure 16A:
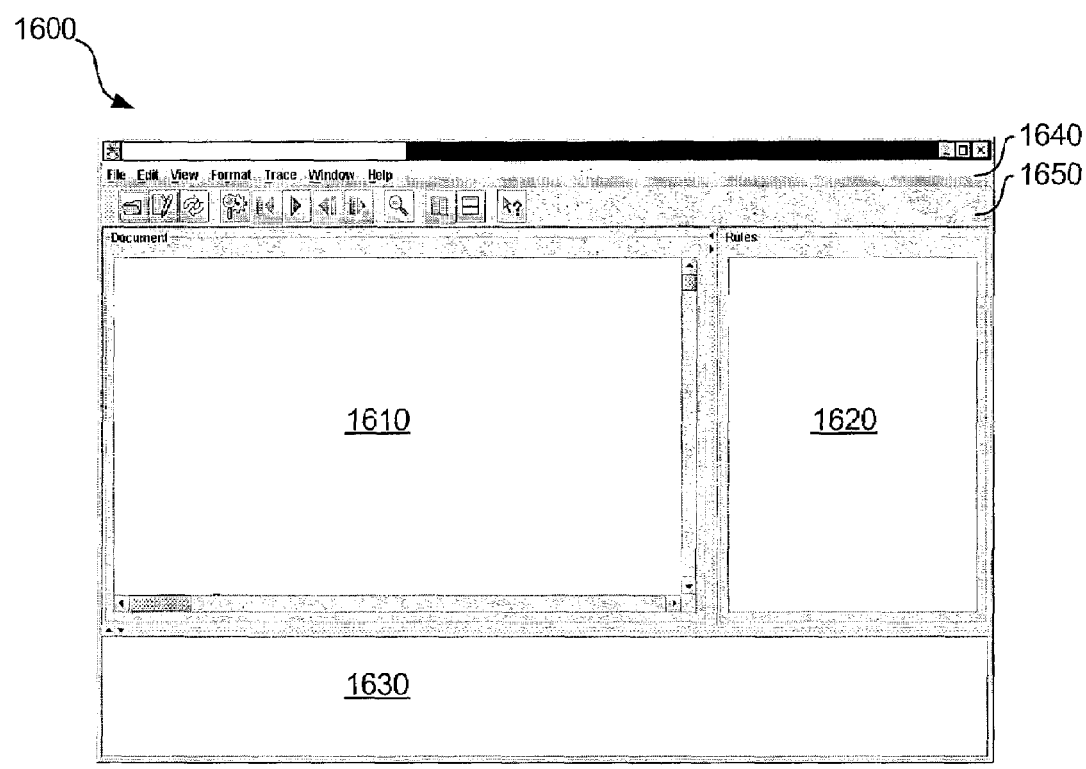
FIGS. 16A and 16B are display diagrams illustrating a validation tool user interface.

Referring now to FIG. 16A, a graphical user interface (GUI) 1600 for the Validation Tool is illustrated. The GUI includes a Document Panel 1610, a Rules Panel 1620, a Message Log Panel 1630, a Menu Bar 1640 and a Toolbar 1650. Documents which are loaded into the Validation Tool application appear in the Document Panel 1610 and rules contained in the validation suite, loaded from the DTD file, appear in the Rules Panel 1620. A record of the interaction between the user and the Validation Tool appears in the Message Log Panel 1630. The panels may be resized, hidden or rearranged. The Validation Tool is given commands through either the Menu Bar 1640 or the Toolbar 1650.

Figure 16B:
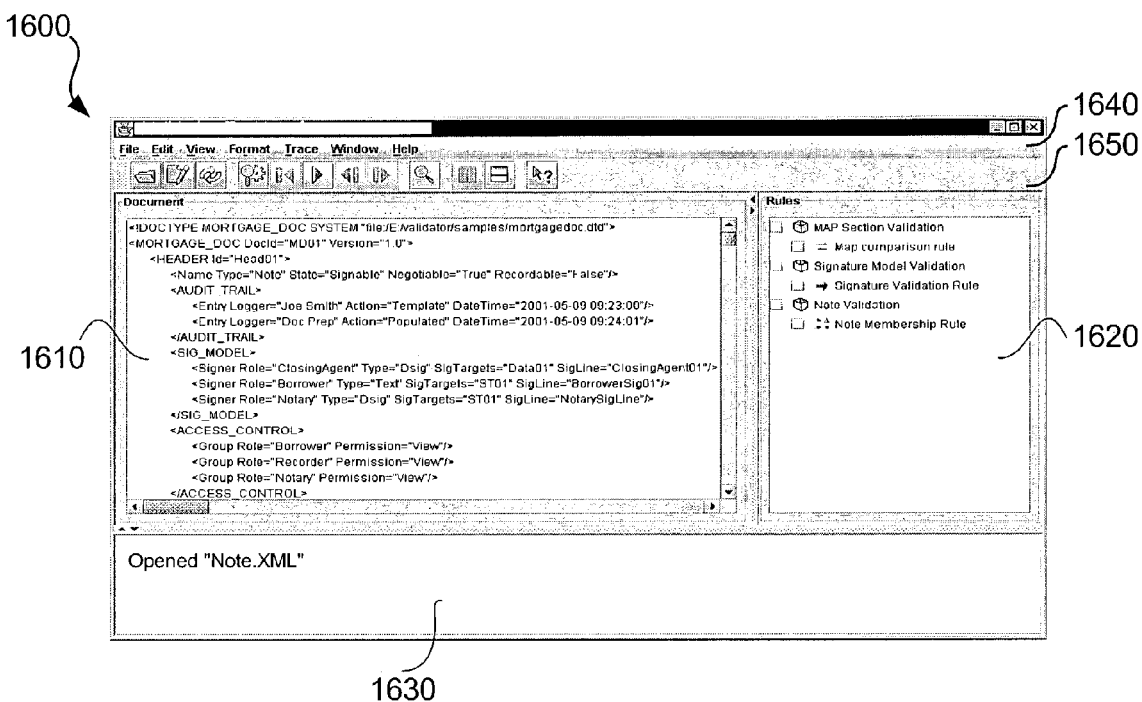

FIG. 16B depicts a screenshot of a Validation Tool GUI, as shown in FIG. 16A, in the process of validating a document "Note.XML." The Document Panel 1610 displays a portion of the text of Note.XML. The Rules Panel 1620 lists the rules that are going to be used to validate Note.XML. Finally, the Message Log Panel 1630 presents a log of the activities of the Validation Tool. For example, as illustrated the Message Log Panel reflects that the file Note.XML has been successfully opened.

The following options are available through the Menu Bar's pulldown menus: File (exit the Validation Tool, open, reload or close document files); Edit (launch an external text editor or clear the Message Log Panel 1630); View (toggle the panels of the Validation Tool GUI or change the layout of the GUI window); Format (change font, typestyle or typesize of the text displayed in the Document Panel 1610); Trace (control validation and toggle tracing on and off); Window (create a new Validation Tool window or display the document in a browser); and Help (access the Validation Tool help files).

As shown in FIGS. 16A and 16B, the elements of the Toolbar shown as graphical buttons include Open Document, Edit, Reload Document, Enable Tracing, Reset Tracing, Start/Resume Validation, Step Forward, Step Back, Display HTML View, Split Vertically, Split Horizontally and the Contextual Help. The Toolbar provides push-button versions of the more frequently used commands for the Validation Tool. The Open Document button is used to load a document into the Validation Tool. The Edit Button is used to edit the contents of a document. The Reload Document button is used to reload the last document opened by the Validation Tool. The Enable Tracing Button activates the tracing feature, allowing the user to step through the validation process one rule at a time. The Reset Tracing Button is used to reposition the tracing mechanism to the beginning of a document. The Start/Resume Validation Button is used to validate the rest of the document. The Step Forward button is used to apply the next rule in the validation process. The Step Back button is used to apply the previous rule to the document. The Display HTML View button is used to display the View Section of a document. The Split Vertically and Split Horizontally buttons are used to change the window layout to vertical (as illustrated in FIGS. 16A and 16B, Document Panel 1610 and Rules Panel 1620 are side by side) or horizontal (Document Panel 1610 would be above the Rules Panel 1620). The Contextual Help button will bring up help information about specific parts of the Validation Tool interface.

Figure 17:
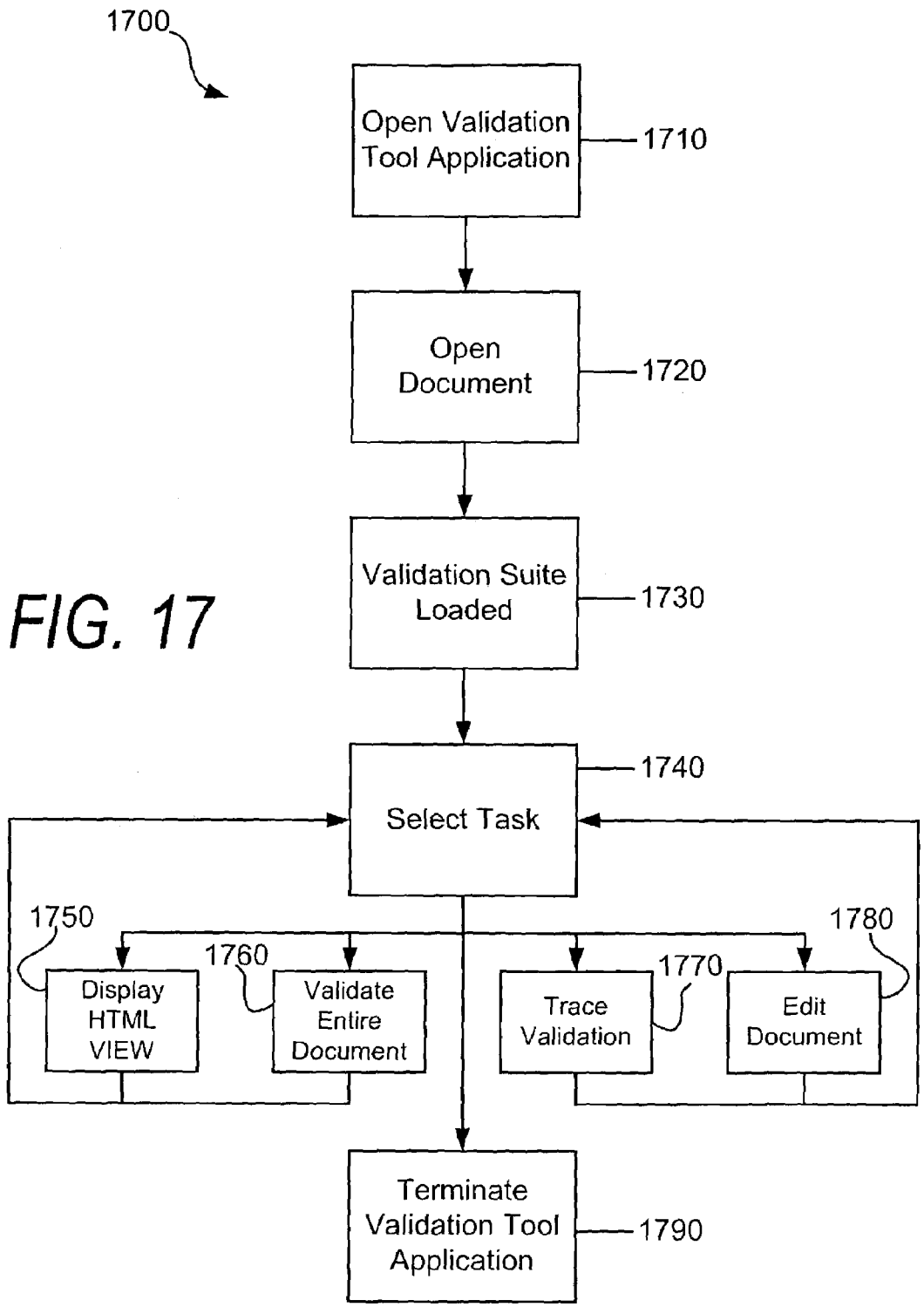
FIG. 17 is a flow diagram illustrating use of the validation tool interface to validate an electronic document.

The flow diagram of FIG. 17 illustrates an embodiment of a process 1700 for validating an electronic document. The user opens 1710 the Validation Tool program, and opens 1720 a document, such as by opening the described popup window or by selecting File-Open from a pull-down menu. The validation suite associated with the document is loaded 1730, and a summary of the validation rules appears in the Rules Panel. The text of the document is displayed in the Document Panel. If the Validation Tool is unable to open either the document or its associated validation suite, an appropriate error message will be displayed in the Message Log Panel. Otherwise, a message that the document has been opened will appear in the Message Log Panel.

The user then may select 1740 one of several task options 1750-1780. For example, the user may display 1750 a facsimile of the document as it would appear on paper by using the Windows-HTML View pulldown command or by pressing the View HTML button. An HTML browser window containing the formatted View Section of the document will appear on screen.

The user may then validate 1760 the entire document without tracing, by selecting the Trace-Start/Resume pulldown command or the Start/Resume Validation button. The Validation Tool will then check the entire document from beginning to end against all of the rules in the validation suite. If the validation is successful a message will appear confirming that the document is valid. A validation stamp may also be appended to the document. If the document fails a test, a message will appear informing the user that the document is invalid. Text describing the specific error or errors will appear in the Message Log Panel.

The user may apply 1770 the tracing functionality to document validation by selecting the Trace-Enable Tracing pull down command or by pressing the Enable Tracing button. At this point the Step Forward button and the Reset Tracing button will become active. The user may validate the entire document by selecting the Trace-Start/Resume pulldown command or the Start/Resume Validation button. The Validation Tool will then check the entire document. As the Validation Tool proceeds through the document, the portion of the document being examined and the current rule being applied are highlighted. When the validation is successful, the last rule set in the Rule Panel to be applied is highlighted. Otherwise, the rule set where an error occurred is highlighted.

With tracing turned on, the user may also perform a rule-by-rule validation of the document. This is useful if the user wants to isolate the source of an error in the document. To go forward one rule, the user may select the Trace-Step Forward pulldown command or press the Step Forward button. To go back one rule, the user may select the Trace-Step Back pulldown command or press the Step Back button. To restart the validation of the document, the user can use the Trace-Reset pull down command or the Rest Tracing button.

The user may also edit the contents of a document by selecting the Edit-Edit Document pull down command or the Edit Document button (1780). This will launch the associated text editor. This is useful if the user wishes to make modifications to the document or to attempt to rectify a problem that the Validation Tool has identified. The user may terminate 1790 the Validation Tool application as indicated.

Thus embodiments of the present invention provide validation of electronic documents. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A computer implemented method for validating electronic documents, the method comprising:
   receiving an electronic document, the electronic document having a main data portion and a view portion, wherein the main data portion can be parsed separately from the view portion, and the view portion includes presentation formatting for at least one display corresponding to the main data portion;
   retrieving a set of validation rules corresponding to the electronic document, the set of validation rules including comparison rules for determining whether a first display provided by the view portion substantially matches the main data portion for a first set of values;
   applying the set of validation rules to the first electronic document;
   determining that the electronic document is valid based upon a determination that the first display substantially matches the main data portion for the first set of values, wherein the determination whether the first display substantially matches the main data portion comprises accessing a plurality of linking elements in the electronic document, wherein individual ones of the plurality of linking elements respectively associate a first attribute and a second attribute, the first attribute corresponding to a main data value for a particular informational field in the main data portion and the second attribute corresponding to a view data value for the particular informational field in the view portion, and determining that the first display substantially matches the main data portion where the main data value equals the view data value; and
   outputting an electronic document validation result to reflect determination that the electronic document is valid.

2. The method of claim 1, wherein the linking element identifies the main data value and the view data value by respectively including pointers to values in the main data portion and the view portion.

3. The method of claim 2, wherein the electronic document includes a map portion that includes the linking element.

4. The method of claim 3, wherein the map portion is included in the main data portion.

5. The method of claim 1, wherein the main data value and the view data value have different formats, and a conversion is applied to at least one of the main data value and the view data value prior to determining whether the main data value substantially matches the view data value.

6. The method of claim 1, wherein the set of validation rules further includes identifier reference rules for examining values that are assigned to fields in the main data portion, and determining whether the values corresponding to the fields have expected criteria.

7. The method of claim 1, wherein the set of validation rules further includes membership rules for determining whether the first electronic document includes a set of fields required for electronic documents in a particular environment.

8. The method of claim 7, wherein a document type definition specifies a general set of fields that are required for a plurality of environments, and a general validation construes the general set of fields as optional components in the electronic document prior to validation of the electronic document according to the particular environment through the membership rules.

9. The method of claim 1, further comprising:
   using the set of validation rules to determine whether a second display provided by the view portion substantially matches the main data portion for a second set of values; and
   determining that the electronic document is valid upon a determination that the second display substantially matches the main data portion for the second set of values.

10. The method of claim 9, wherein the electronic document corresponds to a mortgage transaction and the first and second displays respectively correspond to different documents used in the mortgage transaction.

11. The method of claim 1, wherein the first display is at least one of a printed display and a computer generated display.

12. The method of claim 1, wherein outputting the electronic document validation result comprises updating the electronic document to reflect determination that the electronic document is valid.

13. The method of claim 1, further comprising:
enabling a tracing function that accommodates a rule by rule application and tracing of rules in the set of validation rules by a user, which provides for an identification of the source of an error in the electronic document.

14. The method of claim 1, wherein outputting the electronic document validation result comprises providing a message to reflect determination that the electronic document is valid.

15. A computer program product for validating electronic documents, the computer program product stored on a computer readable medium and adapted to perform operations comprising:
receiving an electronic document, the electronic document having a main data portion and a view portion, wherein the main data portion can be parsed separately from the view portion, and the view portion includes presentation formatting for at least one display corresponding to the main data portion;
retrieving a set of validation rules corresponding to the electronic document, the set of validation rules including comparison rules for determining whether a first display provided by the view portion substantially matches the main data portion for a first set of values;
applying the set of validation rules to the first electronic document;
determining that the electronic document is valid based upon a determination that the first display substantially matches the main data portion for the first set of values, wherein the determination whether the first display substantially matches the main data portion comprises accessing a plurality of linking elements in the electronic document, wherein individual ones of the plurality of linking elements respectively associate a first attribute and a second attribute, the first attribute corresponding to a main data value for a particular informational field in the main data portion and the second attribute corresponding to a view data value for the particular informational field in the view portion, and determining that the first display substantially matches the main data portion where the main data value equals the view data value; and
outputting an electronic document validation result to reflect determination that the electronic document is valid.

16. The computer program product of claim 15, wherein the linking element identifies the main data value and the view data value by respectively including pointers to values in the main data portion and the view portion.

17. The computer program product of claim 16, wherein the electronic document includes a map portion that includes the linking element.

18. The computer program product of claim 17, wherein the map portion is included in the main data portion.

19. The computer program product of claim 15, wherein the main data value and the view data value have different formats, and a conversion is applied to at least one of the main data value and the view data value prior to determining whether the main data value substantially matches the view data value.

20. The computer program product of claim 15, wherein the set of validation rules further includes identifier reference rules for examining values that are assigned to fields in the main data portion, and determining whether the values corresponding to the fields have expected criteria.

21. The computer program product of claim 15, wherein the set of validation rules further includes membership rules for determining whether the first electronic document includes a set of fields required for electronic documents in a particular environment.

22. The computer program product of claim 21, wherein a document type definition specifies a general set of fields that are required for a plurality of environments, and a general validation construes the general set of fields as optional components in the electronic document prior to validation of the electronic document according to the particular environment through the membership rules.

23. The computer program product of claim 15, wherein the operations further comprise:
using the set of validation rules to determine whether a second display provided by the view portion substantially matches the main data portion for a second set of values; and
determining that the electronic document is valid upon a determination that the second display substantially matches the main data portion for the second set of values.

24. The computer program product of claim 23, wherein the electronic document corresponds to a mortgage transaction and the first and second displays respectively correspond to different documents used in the mortgage transaction.

25. The computer program product of claim 15, wherein the first display is at least one of a printed display and a computer generated display.

26. The computer program product of claim 15, wherein outputting the electronic document validation result comprises updating the electronic document to reflect determination that the electronic document is valid.

27. The computer program product of claim 15, wherein the instructions further comprise:
enabling a tracing function that accommodates a rule by rule application and tracing of rules in the set of validation rules by a user, which provides for an identification of the source of an error in the electronic document.

28. The computer program product of claim 15, wherein outputting the electronic document validation result comprises providing a message to reflect determination that the electronic document is valid.

29. An electronic document validation apparatus for validating electronic documents, the validation apparatus comprising:
means for receiving an electronic document, the electronic document having a main data portion and a view portion, wherein the main data portion can be parsed separately from the view portion, and the view portion includes presentation formatting for at least one display corresponding to the main data portion;
means for retrieving a set of validation rules corresponding to the electronic document, the set of validation rules including comparison rules for determining whether a first display provided by the view portion substantially matches the main data portion for a first set of values;
means for applying the set of validation rules to the first electronic document;
means for determining that the electronic document is valid based upon a determination that the first display substantially matches the main data portion for the first set of values, wherein the determination whether the first display substantially matches the main data portion comprises accessing a plurality of linking elements in the electronic document, wherein individual ones of the plurality of linking elements respectively associate a first attribute and a second attribute, the first attribute corresponding to a main data value for a particular informational field in the main data portion and the second attribute corresponding to a view data value for the particular informational field in the view portion and determining that the first display substantially matches the main data portion where the main data value equals the view data value; and means for outputting an electronic document validation result to reflect determination that the electronic document is valid.

30. The validation apparatus of claim 29, wherein the linking element identifies the main data value and the view data value by respectively including pointers to values in the main data portion and the view portion.

31. The validation apparatus of claim 30, wherein the electronic document includes a map portion that includes the linking element.

32. The validation apparatus of claim 31, wherein the map portion is included in the main data portion.

33. The validation apparatus of claim 29, wherein the main data value and the view data value have different formats, and a conversion is applied to at least one of the main data value and the view data value prior to determining whether the main data value substantially matches the view data value.

34. The validation apparatus of claim 29, wherein the set of validation rules further includes identifier reference rules for examining values that are assigned to fields in the main data portion, and determining whether the values corresponding to the fields have expected criteria.

35. The validation apparatus of claim 29, wherein the set of validation rules further includes membership rules for determining whether the first electronic document includes a set of fields required for electronic documents in a particular environment.

36. The validation apparatus of claim 35, wherein a document type definition specifies a general set of fields that are required for a plurality of environments, and a general validation construes the general set of fields as optional components in the electronic document prior to validation of the electronic document according to the particular environment through the membership rules.

37. The validation apparatus of claim 29, further comprising:
means for using the set of validation rules to determine whether a second display provided by the view portion substantially matches the main data portion for a second set of values; and
means for determining that the electronic document is valid upon a determination that the second display substantially matches the main data portion for the second set of values.

38. The validation apparatus of claim 37, wherein the electronic document corresponds to a mortgage transaction and the first and second displays respectively correspond to different documents used in the mortgage transaction.

39. The validation apparatus of claim 29, wherein the first display is at least one of a printed display and a computer generated display.

40. The validation apparatus of claim 29, wherein the means for outputting the electronic document validation result updates the electronic document to reflect determination that the electronic document is valid.

41. The validation apparatus of claim 29, wherein the instructions further comprise:
enabling a tracing function that accommodates a rule by rule application and tracing of rules in the set of validation rules by a user, which provides for an identification of the source of an error in the electronic document.

42. The validation application of claim 29, wherein the means for outputting the electronic document validation result provides a message to reflect determination that the electronic document is valid.

43. An electronic document validation application, comprising:
an electronic document storage module, which receives an electronic document, the electronic document having a main data portion and a view portion, wherein the main data portion can be parsed separately from the view portion, and the view portion includes presentation formatting for at least one display corresponding to the main data portion;
a validation rules module, in communication with the electronic document storage module, which retrieves a set of validation rules corresponding to the electronic document, the set of validation rules including comparison rules for determining whether a first display provided by the view portion substantially matches the main data portion for a first set of values; and
a rules execution module, in communication with the validation rules module, which applies the set of validation rules to the first electronic document, and determines that the electronic document is valid based upon a determination that the first display substantially matches the main data portion for the first set of values, wherein the determination whether the first display substantially matches the main data portion comprises accessing a plurality of linking elements in the electronic document, wherein individual ones of the plurality of linking elements respectively associate a first attribute and a second attribute, the first attribute corresponding to a main data value for a particular informational field in the main data portion and the second attribute corresponding to a view data value for the particular informational field in the view portion, and determining that the first display substantially matches the main data portion where the main data value equals the view data value.

44. The validation application of claim 43, wherein the linking element identifies the main data value and the view data value by respectively including pointers to values in the main data portion and the view portion.

45. The validation application of claim 44, wherein the electronic document includes a map portion that includes the linking element.

46. The validation application of claim 45, wherein the map portion is included in the main data portion.

47. The validation application of claim 43, wherein the main data value and the view data value have different formats, and a conversion is applied to at least one of the main data value and the view data value prior to determining whether the main data value substantially matches the view data value.

48. The validation application of claim 43, wherein the set of validation rules further includes identifier reference rules for examining values that are assigned to fields in the main data portion, and determining whether the values corresponding to the fields have expected criteria.

49. The validation application of claim 43, wherein the set of validation rules further includes membership rules for determining whether the first electronic document includes a set of fields required for electronic documents in a particular environment.

50. The validation application of claim 49, wherein a document type definition specifies a general set of fields that are required for a plurality of environments, and a general validation construes the general set of fields as optional components in the electronic document prior to validation of the electronic document according to the particular environment through the membership rules.

51. The validation application of claim 43, wherein the rules execution module uses the set of validation rules to determine whether a second display provided by the view portion substantially matches the main data portion for a second set of values, and determines that the electronic document is valid upon a determination that the second display substantially matches the main data portion for the second set of values.

52. The validation application of claim 51, wherein the electronic document corresponds to a mortgage transaction and the first and second displays respectively correspond to different documents used in the mortgage transaction.

53. The validation application of claim 43, wherein the first display is at least one of a printed display and a computer generated display.

54. The validation application of claim 43, further comprising:

an electronic document updating module, in communication with the rules execution module, which updates the electronic document to reflect determination that the electronic document is valid.

55. The validation application of claim 43, wherein the a tracing function is enabled to accommodate a rule by rule application and tracing of rules in the set of validation rules by a user to provide for an identification of the source of an error in the electronic document.

56. The validation application of claim 43, further comprising outputting a message to reflect determination that the electronic document is valid.

* * * * *